United States Patent
Capron et al.

(10) Patent No.: US 12,352,215 B2
(45) Date of Patent: Jul. 8, 2025

(54) DEVICES AND METHODS FOR GUIDING BLEED AIR IN A TURBOFAN ENGINE

(71) Applicant: PRATT & WHITNEY CANADA CORP., Longueuil (CA)

(72) Inventors: Alexandre Capron, Toronto (CA); Karan Anand, Mississauga (CA); Hien Duong, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/204,646

(22) Filed: Jun. 1, 2023

(65) Prior Publication Data

US 2023/0304448 A1 Sep. 28, 2023

Related U.S. Application Data

(63) Continuation of application No. 16/929,715, filed on Jul. 15, 2020, now Pat. No. 11,702,995.

(51) Int. Cl.
| | |
|---|---|
| *F02C 9/18* | (2006.01) |
| *F02C 6/08* | (2006.01) |
| *F02C 7/18* | (2006.01) |

(52) U.S. Cl.
CPC ............... *F02C 9/18* (2013.01); *F02C 6/08* (2013.01); *F02C 7/18* (2013.01); *F05D 2240/12* (2013.01); *F05D 2260/606* (2013.01)

(58) Field of Classification Search
CPC ..................................... F02C 9/18; F02C 6/08
See application file for complete search history.

(56) References Cited

U.S. PATENT DOCUMENTS

| | | | |
|---|---|---|---|
| 4,722,821 | A | 2/1988 | Vermilye |
| 9,399,951 | B2 | 7/2016 | Haugen et al. |
| 9,506,424 | B2 | 11/2016 | Siering |
| 10,233,845 | B2 | 3/2019 | Moniz et al. |
| 10,247,043 | B2 | 4/2019 | Hasting et al. |
| 10,287,992 | B2 | 5/2019 | Tan et al. |
| 10,393,128 | B2 | 8/2019 | Urac et al. |
| 10,502,132 | B2 | 12/2019 | Guijarro Valencia et al. |
| 2001/0042368 | A1 | 11/2001 | Negulescu |
| 2010/0115963 | A1 | 5/2010 | Kirby |
| 2010/0158684 | A1* | 6/2010 | Baralon .................. F01D 5/146 |
| | | | 415/208.1 |
| 2010/0199633 | A1 | 8/2010 | Martensson |
| 2015/0159560 | A1 | 6/2015 | Kumar et al. |
| 2015/0176500 | A1 | 6/2015 | Taylor-Tibbott |

(Continued)

OTHER PUBLICATIONS

European Patent Office, Communication re. extended European search report for European Patent Application No. 21185945.9, Dec. 14, 2021.

(Continued)

*Primary Examiner* — Todd E Manahan
*Assistant Examiner* — Alyson Joan Harrington
(74) *Attorney, Agent, or Firm* — Norton Rose Fulbright Canada LLP

(57) ABSTRACT

Device and methods for guiding bleed air in a turbofan gas turbine engine are disclosed. The devices provided include louvers and baffles that guide bleed air toward a bypass duct of the turbofan engine. The louvers and baffles have a geometric configuration that promotes desirable flow conditions and reduced energy loss.

19 Claims, 25 Drawing Sheets

(56) References Cited

U.S. PATENT DOCUMENTS

| | | |
|---|---|---|
| 2015/0176590 A1 | 6/2015 | Taylor-Tibbott |
| 2015/0275757 A1 | 10/2015 | Turner et al. |
| 2016/0130973 A1* | 5/2016 | Pachidis ............... F04D 29/684 |
| | | 415/148 |
| 2017/0321602 A1 | 11/2017 | Guijarro Valencia |
| 2018/0038279 A1* | 2/2018 | Joshi ......................... F02C 6/08 |
| 2018/0080337 A1 | 3/2018 | Bruhat et al. |
| 2019/0345875 A1 | 11/2019 | Szydlowski |

OTHER PUBLICATIONS

European Patent Office, Communication re. extended European search report for European patent application No. 24152920.5, May 8, 2024.

\* cited by examiner

2100

2102 — CONVEYING THE BLEED AIR RECEIVED FROM THE CORE ENGINE ALONG A GENERAL BLEED FLOW DIRECTION THAT IS BETWEEN 60 AND 120 DEGREES OF A GENERAL BYPASS FLOW DIRECTION OF THE BYPASS DUCT

2104 — AFTER CONVEYING THE BLEED AIR ALONG THE GENERAL BLEED FLOW DIRECTION, GUIDING THE BLEED AIR AWAY FROM THE GENERAL BLEED FLOW DIRECTION

2106 — AFTER GUIDING THE BLEED AIR AWAY FROM THE GENERAL BLEED FLOW DIRECTION, GUIDING THE BLEED AIR TOWARD THE GENERAL BLEED FLOW DIRECTION

2108 — AFTER GUIDING THE BLEED AIR TOWARD THE GENERAL BLEED FLOW DIRECTION, DISCHARGING THE BLEED AIR INTO THE BYPASS DUCT

FIG. 21

DEVICES AND METHODS FOR GUIDING BLEED AIR IN A TURBOFAN ENGINE

CROSS REFERENCE TO RELATED APPLICATION

This application is a continuation of U.S. patent application Ser. No. 16/929,715 filed on Jul. 15, 2020 and incorporated herein by reference.

TECHNICAL FIELD

The disclosure relates generally to turbofan engines and, more particularly, to devices and methods for facilitating the discharge of bleed air into a bypass duct of a turbofan engine.

BACKGROUND OF THE ART

Bypass flow generated by a fan of a turbofan engine may provide a substantial portion of the overall propulsive thrust generated by the turbofan engine. In some situations, it is desirable to direct some compressed air from a core gas path of the turbofan engine into a bypass duct of the turbofan engine to achieve a desired operating condition of the turbofan engine. Such bleed of the compressed air into the bypass duct may be achieved via a bleed-off valve and a bleed air passage opening into the bypass duct. Directing the compressed air (also called "bleed air") to the bypass duct may result in energy losses due to disruptive airflows and modification of the bypass flow caused by the bleed air discharge. Improvement is desired.

SUMMARY

In one aspect, the disclosure describes a device for guiding bleed air into a bypass duct of a turbofan engine having a central axis. The device comprises:
- a body defining a flow-guiding surface having opposite first and second ends defining a span of the flow-guiding surface around the central axis, the flow-guiding surface extending between a radially-inner edge of the body and a radially-outer edge of the body relative to the central axis; and
- a side wall adjacent the first end of the flow-guiding surface of the body, the side wall extending at least partially axially relative to the central axis, the side wall extending from a first position radially inwardly of the radially-inner edge of the body to a second position radially outwardly of the radially-inner edge of the body relative to the central axis.

The second position may be adjacent the radially-outer edge of the body.

The side wall may be substantially planar.

The side wall may be non-parallel to a radial direction relative to the central axis.

The side wall may be curved.

The side wall may have a Bellmouth profile when viewed along the central axis.

The side wall may have a unitary construction with the body.

The device may comprise a baffle disposed axially of the body to define a bleed air passage between the baffle and the flow-guiding surface of the body. A gap may be defined between the side wall and the baffle.

A gap may be defined between the side wall and a casing of the engine.

The side wall may be a first side wall. The device may include a second side wall adjacent the second end of the flow-guiding surface of the body. The second side wall may extend at least partially axially relative to the central axis.

The flow-guiding surface may be a first flow-guiding surface. The body may define a second flow-guiding surface having opposite first and second ends defining a span of the second flow-guiding surface around the central axis. The second flow-guiding surface may extend between the radially-inner edge of the body and the radially-outer edge of the body relative to the central axis. The second flow-guiding surface may be angularly spaced apart from the first flow-guiding surface relative to the central axis.

The first end of the first flow-guiding surface may be distal to the second flow-guiding surface. The second end of the first flow-guiding surface may be proximal to the second flow-guiding surface. The first end of the second flow-guiding surface may be proximal to the first flow-guiding surface. The second end of the second flow-guiding surface may be distal to the first flow-guiding surface. The side wall may be a first side wall. The device may include a second side wall adjacent the second end of the second flow-guiding surface of the body. The second side wall may extend at least partially axially relative to the central axis.

The device may comprise: a third side wall adjacent the second end of the first flow-guiding surface of the body, the third side wall extending at least partially axially relative to the central axis; and a fourth side wall adjacent the first end of the second flow-guiding surface of the body, the fourth side wall extending at least partially axially relative to the central axis.

The third and fourth side walls may be substantially planar and divergent in a radially outward direction relative to the central axis.

The side wall may terminate at the first position. The first position may be radially inwardly of the radially-inner edge by an amount between 5% and 100% of a radial distance between the radially-inner edge and the radially-outer edge of the body.

Embodiments may include combinations of the above features.

In another aspect, the disclosure describes a turbofan engine comprising:
- a core engine;
- an inner casing in which the core engine is disposed;
- a bypass duct defined between the inner casing and an outer casing; and
- a device defining part of a bleed air passage extending between the core engine and the bypass duct via an opening through the inner casing, the device including:
  - a body defining a flow-guiding surface having opposite first and second ends defining a span of the flow-guiding surface around a central axis of the turbofan engine, the flow-guiding surface extending between a radially-inner edge of the body and a radially-outer edge of the body relative to the central axis; and
  - a side wall adjacent the first end of the flow-guiding surface of the body, the side wall extending at least partially axially relative to the central axis, the side wall extending from a first position radially inwardly of the radially-inner edge of the body to a second position radially outwardly of the radially-inner edge of the body relative to the central axis.

The flow-guiding surface may be a first flow-guiding surface. The opening in the inner casing may be a first opening. The body may define a second flow-guiding surface for guiding bleed air from the bleed air passage into the bypass duct via a second opening through the inner casing. The second flow-guiding surface may have opposite first and second ends defining a span of the second flow-guiding surface around the central axis. The second flow-guiding surface may be angularly spaced apart from the first flow-guiding surface relative to the central axis.

Embodiments may include combinations of the above features.

In another aspect, the disclosure describes a method of operating a turbofan engine having a central axis. The method may comprise:

receiving bleed air from a core engine of the turbofan engine;

guiding the bleed air along a streamwise direction into the bypass duct using a flow-guiding surface extending partially around the central axis; and hindering a transverse flow of bleed air that is transverse to the streamwise direction, the hindering of the transverse flow being conducted at a first streamwise location coincident with the flow-guiding surface, and at a second streamwise location that is upstream of the flow-guiding surface.

The method may comprise hindering the transverse flow of bleed air at the first and second streamwise locations using a side wall extending at least partially axially relative to the central axis.

Embodiments may include combinations of the above features.

In another aspect, the disclosure describes a louver for guiding bleed air into a bypass duct of a turbofan engine. The louver comprises:

a first portion defining a flow-guiding surface at least partially defining a fluid passage, the first portion having a first camber line extending between a leading end and a trailing end of the first portion; and a second portion adjacent the trailing end of the first portion, the second portion protruding into the fluid passage and having a second camber line that forms a discontinuity in tangency with the first camber line.

The first and second portions may have a unitary construction.

The first camber line may curved. The second camber line may be linear.

The first camber line may be arcuate.

The first and second camber lines may define an intersecting angle between 45 and 135 degrees.

A length of the second camber line may be between 4% and 40% of a sum of a length of the first camber line and a length of the second camber line.

A width of the second portion measured transversely to the second camber line may be between 2% and 40% of a sum of a length of the first camber line and a length of the second camber line.

The second portion may include a protruding surface adjacent the flow-guiding surface and oriented at an angle between 45 and 135 degrees of the flow-guiding surface.

Embodiments may include combinations of the above features.

In another aspect, the disclosure describes a turbofan engine comprising:

a core engine;

an inner casing in which the core engine is disposed;

a bypass duct defined between the inner casing and an outer casing; and a louver defining part of a bleed air passage extending between the core engine and the bypass duct via an opening through the inner casing, the louver including:

a first portion defining a flow-guiding surface having an upstream end and a downstream end; and a second portion adjacent the downstream end of the flow-guiding surface and protruding into the bleed air passage.

The second portion may define a protruding surface adjacent the flow-guiding surface. The protruding surface may have a curvature different from the flow-guiding surface.

The flow-guiding surface may have a curved cross-sectional profile in a plane parallel to and intersecting a central axis of the turbofan engine. The protruding surface may have a linear cross-sectional profile in the plane.

The linear cross-sectional profile may be oriented at an angle between 45 and 135 degrees relative to the curved cross-sectional profile.

The protruding surface may be a first protruding surface. The second portion may include a second protruding surface generally parallel to the first protruding surface.

The turbofan engine may comprise a baffle opposite the louver and cooperating with the louver to define the part of the bleed air passage. The baffle and the second portion of the louver may define a throat of the bleed air passage.

The first portion may have a first camber line extending between the upstream end and the downstream end. The second portion may have a second camber line that forms a discontinuity in tangency with the first camber line.

The first and second camber lines may define an intersecting angle between 45 and 135 degrees.

A length of the second camber line may be between 4% and 40% of a sum of a length of the first camber line and a length of the second camber line.

A width of the second portion measured transversely to the second camber line may be between 2% and 40% of a sum of a length of the first camber line and a length of the second camber line.

Embodiments may include combinations of the above features.

In another aspect, the disclosure describes a method of guiding bleed air in a turbofan engine having a core engine and a bypass duct. The method comprises:

guiding the bleed air received from the core engine toward a general bypass flow direction of bypass air flowing into the bypass duct;

after guiding the bleed air toward the general bypass flow direction, causing the bleed air to swerve; and after causing the bleed air to swerve, discharging the bleed air into the bypass duct.

The bleed air may be discharged into the bypass duct via an opening through an inner casing of the turbofan engine defining part of the bypass duct. The method may include causing a region of relatively low pressure in the bypass duct at or upstream of the opening to draw the bypass air toward the inner casing.

Causing the bleed air to swerve may include guiding the bleed air radially inwardly relative to a central axis of the turbofan engine. A louver may be used to: guide the bleed air toward a bypass flow direction; cause the bleed air to swerve; and cause the region of relatively low pressure in the bypass duct at or upstream of the opening through the inner casing.

Embodiments may include combinations of the above features.

In another aspect, the disclosure describes a bleed air duct for conveying bleed air from a core engine to a bypass duct of a turbofan engine, the bleed air duct comprising:

a first duct portion configured to convey the bleed air along a general bleed flow direction that is between 60 and 120 degrees of a general bypass flow direction of the bypass duct; and a second duct portion disposed downstream of the first duct portion and configured to guide the bleed air from the general bleed flow direction toward the general bypass flow direction, the second duct portion including a baffle defining part of a bleed air passage, the baffle including a concave portion that is concave relative to the bleed air passage and a convex portion that is convex relative to the bleed air passage, the convex portion being disposed downstream of the concave portion.

The baffle may have a cross-sectional profile in a plane parallel to and intersecting a central axis of the turbofan engine. The cross-sectional profile may have a chord of maximum chord length that is substantially parallel to the general bleed flow direction. The cross-sectional profile may have a maximum height from the chord. The maximum height may be between 5% and 100% of the maximum chord length.

The maximum height may be between 10% and 50% of the maximum chord length.

The general bleed flow direction may be between 75 and 105 degrees of the general bypass flow direction of the bypass duct.

The general bleed flow direction may be about 90 degrees of the general bypass flow direction of the bypass duct.

The baffle may have a cross-sectional profile in a plane parallel to and intersecting a central axis of the turbofan engine. A concave portion of the cross-sectional profile associated with the concave portion of the baffle may be tangent continuous with a convex portion of the cross-sectional profile associated with the convex portion of the baffle.

The convex portion of the cross-sectional profile may be longer than the concave portion of the cross-sectional profile.

The second duct portion may include a louver. The louver may cooperate with the convex portion of the baffle to define a throat of the bleed air passage.

The second duct portion may include a louver cooperating with the baffle to define the part of the bleed air passage. The baffle may be disposed aft of the louver relative to a central axis of the turbofan engine.

Embodiments may include combinations of the above features.

In another aspect, the disclosure describes a turbofan engine comprising:
a core engine;
an inner casing in which the core engine is disposed;
a bypass duct defined between the inner casing and an outer casing; and
a bleed air duct configured to convey bleed air from the core engine to the bypass duct via an opening through the inner casing, the bleed air duct including:
a first duct portion configured to convey the bleed air along a general bleed flow direction that is between 60 and 120 degrees of a general bypass flow direction of the bypass duct; and
a second duct portion disposed downstream of the first duct portion and configured to guide the bleed air from the general bleed flow direction toward the general bypass flow direction, the second duct portion including a baffle defining part of a bleed air passage, the baffle including a concave portion that is concave relative to the bleed air passage and a convex portion that is convex relative to the bleed air passage, the convex portion being disposed downstream of the concave portion.

The baffle may have a cross-sectional profile in a plane parallel to and intersecting a central axis of the turbofan engine. The cross-sectional profile may have a chord of maximum chord length that is substantially parallel to the general bleed flow direction. The cross-sectional profile may have a maximum height from the chord. The maximum height may be between 5% and 100% of the maximum chord length.

The maximum height may be between 10% and 50% of the maximum chord length.

The general bleed flow direction may be between 75 and 105 degrees of the general bypass flow direction of the bypass duct.

The baffle may have a cross-sectional profile in a plane parallel to and intersecting a central axis of the turbofan engine. A convex portion of the cross-sectional profile associated with the convex portion of the baffle may be longer than a concave portion of the cross-sectional profile associated with the concave portion of the baffle.

The second duct portion may include a louver. The louver may cooperate with the convex portion of the baffle to define a throat of the bleed air passage.

The second duct portion may include a louver cooperating with the baffle to define the part of the bleed air passage. The baffle may be disposed aft of the louver relative to a central axis of the turbofan engine.

Embodiments may include combinations of the above features.

In another aspect, the disclosure describes a method of guiding bleed air in a turbofan engine having a core engine and a bypass duct. The method comprises:
conveying the bleed air received from the core engine along a general bleed flow direction that is between 60 and 120 degrees of a general bypass flow direction of the bypass duct;
after conveying the bleed air along the general bleed flow direction, guiding the bleed air away from the general bleed flow direction;
after guiding the bleed air away from the general bleed flow direction, guiding the bleed air toward the general bleed flow direction; and
after guiding the bleed air toward the general bleed flow direction, discharging the bleed air into the bypass duct.

The method may comprise, after guiding the bleed air toward the general bleed flow direction and before discharging the bleed air into the bypass duct, guiding the bleed air toward the general bypass flow direction.

The method may comprise:
using a concave surface to guide the bleed air away from the general bleed flow direction; and
using a convex surface to guide the bleed air toward the general bleed flow direction and to guide the bleed air toward the general bypass flow direction.

The method may comprise, after conveying the bleed air along the general bleed flow direction and before discharging the bleed air into the bypass duct, causing a deviation of the bleed air spanning over a distance along the general bleed flow direction. A maximum amount of the deviation may be at least 15% of the of the distance along the general bleed flow direction.

Embodiments may include combinations of the above features.

In another aspect, the disclosure describes a bleed air duct for conveying bleed air from a core engine to a bypass duct of a turbofan engine. The bleed air duct comprises:

an upstream duct portion configured to convey the bleed air along a general bleed flow direction; and a downstream duct portion disposed downstream of the upstream duct portion and configured to guide the bleed air from the general bleed flow direction toward a general bypass flow direction of the bypass duct, the downstream duct portion including a baffle defining a flow-guiding surface for guiding the bleed air toward the bypass duct, the baffle protruding into the bypass duct when installed in the turbofan engine.

The general bleed flow direction may be between 60 and 120 degrees of the general bypass flow direction.

The baffle may include a convex portion that is convex relative to a bleed air passage defined by the bleed air duct. The convex portion configured to extend into the bypass duct.

A portion of the baffle protruding into the bypass duct may be configured to overlap a surface of an inner casing defining the bypass duct.

Embodiments may include combinations of the above features.

In another aspect, the disclosure describes a turbofan engine comprising:

a core engine;

an inner casing in which the core engine is disposed;

a bypass duct defined between the inner casing and an outer casing; and a bleed air duct configured to convey bleed air from the core engine to the bypass duct via an opening through the inner casing, the bleed air duct including a baffle defining a flow-guiding surface for guiding the bleed air toward the bypass duct, the baffle protruding into the bypass duct.

The bleed air duct may include:

an upstream duct portion configured to convey the bleed air along a general bleed flow direction that is between 60 and 120 degrees of a general bypass flow direction of the bypass duct; and a downstream duct portion disposed downstream of the upstream duct portion and configured to guide the bleed air from the general bleed flow direction toward the general bypass flow direction.

The baffle may include a convex portion that is convex relative to a bleed air passage defined by the bleed air duct. The convex portion may extend into the bypass duct.

A portion of the baffle protruding into the bypass duct may overlap a surface of the inner casing.

An edge of the baffle may be disposed inside the bypass duct and may define a step inside the bypass duct.

The turbofan engine may comprise a louver cooperating with the baffle to guide the bleed air toward the bypass duct. The baffle may be disposed aft of the louver relative to a central axis of the turbofan engine.

The baffle may extend through the opening through the inner casing.

Embodiments may include combinations of the above features.

In another aspect, the disclosure describes a method of guiding bleed air in a turbofan engine having a core engine and a bypass duct. The method may comprise:

conveying the bleed air received from the core engine along a general bleed flow direction; and after conveying the bleed air along the general bleed flow direction:

using a baffle to guide the bleed air toward a general bypass flow direction of the bypass duct at a location upstream of the bypass duct; and using the baffle to guide the bleed air at a location inside the bypass duct.

The method may comprise using a portion of the baffle protruding into the bypass duct to cause a region of relatively low pressure inside the bypass duct. The region of relatively low pressure being located downstream of the portion of the baffle protruding into the bypass duct.

The location inside the bypass duct may be raised from a radially-inner surface of the bypass duct.

The general bleed flow direction may be between 60 and 120 degrees of the general bypass flow direction.

The baffle may include a convex flow-guiding surface that extends into the bypass duct.

A trailing edge of the baffle may define a step inside the bypass duct.

A portion of the baffle protruding into the bypass duct may overlap a surface of an inner casing partially defining the turbofan engine.

Embodiments may include combinations of the above features.

DESCRIPTION OF THE DRAWINGS

Reference is now made to the accompanying figures in which:

FIG. 21 is a flow chart of another method of guiding bleed air in the turbofan engine;

DETAILED DESCRIPTION

Discharging bleed air into the bypass duct of turbofan engines may be achieved via one or more bleed-off valves and one or more bleed air passages opening to the bypass duct. The geometric configuration of an outlet feeding bleed air into the bypass duct may have a significant effect on a flow inside the bypass duct, either directly by modifying the bypass flow or via the bleed air discharge feeding into the bypass duct. For example, pressure losses may be induced in the bypass duct due to bleed air-induced regions of relatively low pressure, such as separation bubbles and vortical flow regions. Pressure loss reductions may be achieved by encouraging favorable flow conditions in the bypass duct via the geometry of bleed air passages feeding bleed air into the bypass duct. In particular, pressure loss reduction may be achieved via devices such as louvers and baffles at least partially forming bleed air passages feeding bleed air into the bypass duct. Various embodiments of such devices are described herein. It is intended that such embodiments of such devices may be used separately or in combination with each other.

The term "substantially" as used herein may be applied to modify any quantitative representation which could permissibly vary without resulting in a change in the basic function to which it is related.

Figure 1:
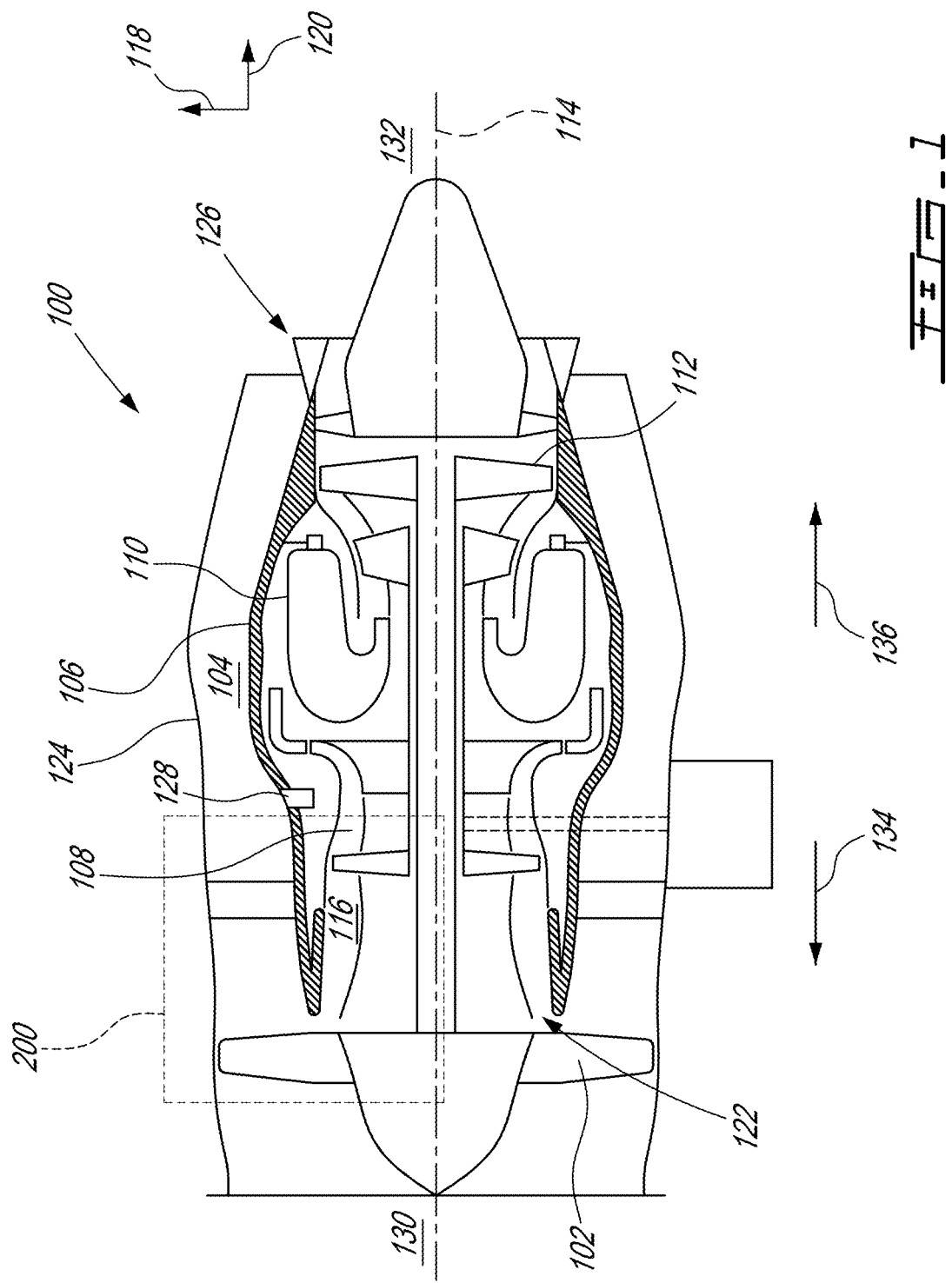
FIG. 1 is a schematic cross-sectional view of an exemplary turbofan gas turbine engine, including one or more bleed air devices as described herein.

FIG. 1 illustrates a turbofan engine 100, including one or more bleed air devices 128 as described herein. The turbofan engine 100 may be of a type preferably provided for use in subsonic flight, generally comprising in serial flow communication a fan 102 through which ambient air is propelled, a compressor section 108 for pressurizing the air, a combustor 110 in which the compressed air is mixed with fuel and ignited for generating an annular stream of hot combustion gases, and a turbine section 112 for extracting energy from the combustion gases. After energy extraction, the gases exit the turbofan engine 100 via an engine outlet 126. Turbofan engine 100 may include a core gas path 116 including the compressor section 108. Turbofan engine 100 may also include bypass duct 104. The compressor section 108 may comprise one or more stages, and may include a first compressor stage, sometimes called a "booster" compressor downstream of the fan 102.

The turbofan engine 100 may have a central axis 114 extending between a fore end 130 and an aft end 132 of the turbofan engine 100 relative to a fore direction 134 and an aft direction 136. The fan 102 may be rotatable about the central axis 114. The fan 102 may be driven by a core engine 122 of turbofan engine 100. An axial direction 120 and a substantially perpendicular radial direction 118 may be defined relative to the central axis 114. The turbofan engine 100 may include inner casing 106 and outer casing 124 housing parts of the turbofan engine 100. The core engine 122 may be disposed in the inner casing 106 of the turbofan engine 100 and be disposed radially inwardly of the bypass duct 104. The bypass duct 104 of the turbofan engine 100 may be defined between the inner casing 106 and the outer casing 124. The inner casing 106 may extend substantially annularly around the central axis 114. The bypass duct 104 may receive a portion of the air propelled by the fan 102 towards an engine outlet 126 for exhausting into the ambient atmosphere. The core engine 122 may receive another portion of the air propelled by the fan 102 in the core gas path 116 for generating power via combustion in the combustor 110.

Figure 2:
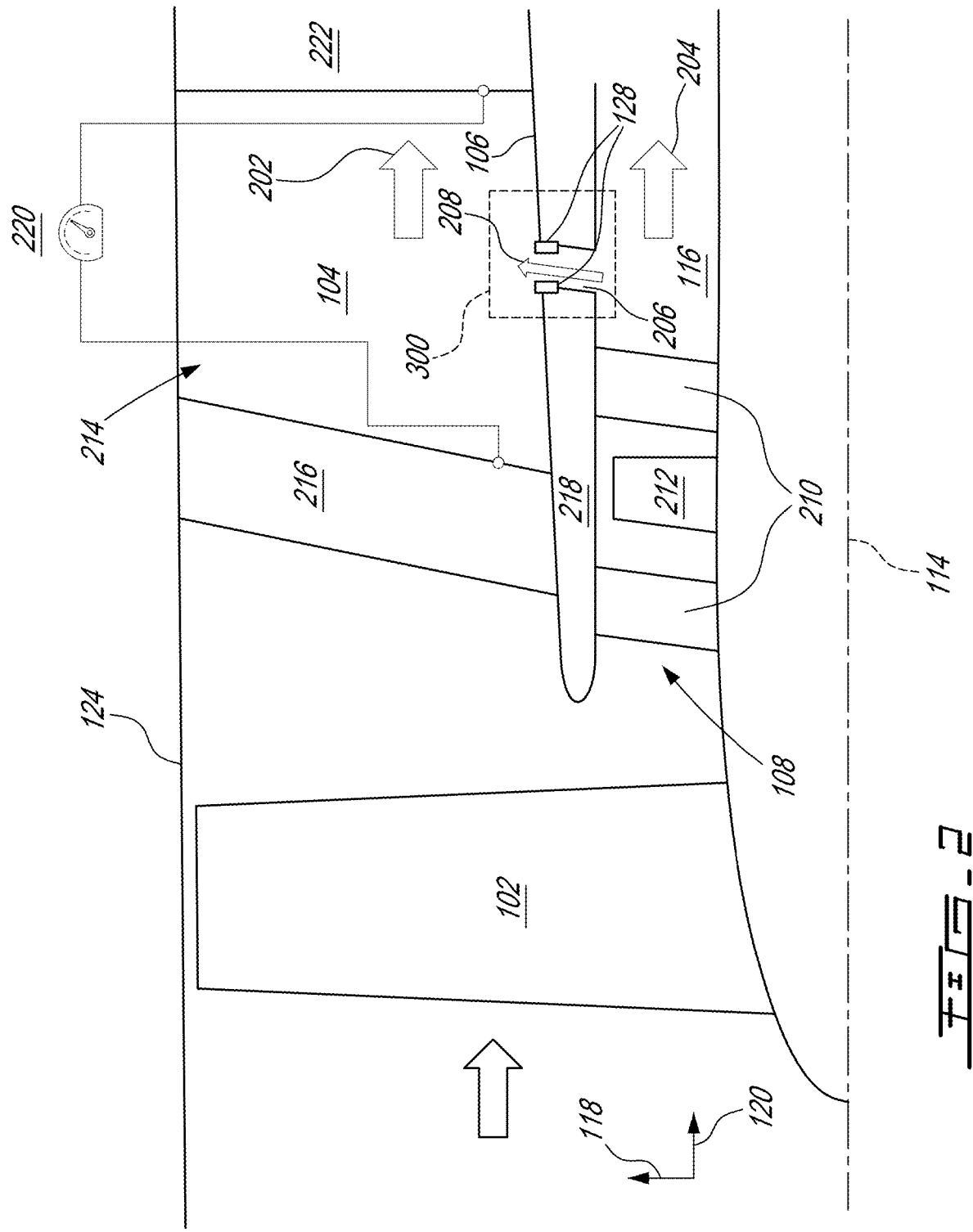
FIG. 2 is a detailed schematic view of region 200 of FIG. 1, showing an exemplary compressor section and bypass duct of the turbofan engine.

FIG. 2 is a detailed schematic view of the region 200 of FIG. 1, showing part of the compressor section 108 and of the bypass duct 104 of the turbofan engine 100. The compressor section 108 may comprise one or more bladed rotors 212 and stators 210. Ambient air entering turbofan engine 100 may be split into a bypass flow 202 and a core gas path flow 204 via splitter 218. The bypass flow 202 may be oriented substantially in the axial direction 120. The bypass duct 104 may include a bypass stator 216 (e.g. vane(s)) for guiding the bypass flow 202, and one or more downstream bypass struts 222 providing structural support between the inner casing 106 and outer casing 124. The bypass struts 222 may be disposed downstream of where the bleed air 208 is discharged into the bypass duct 104. In some situations, discharge of the bleed air 208 via the bleed air passage 206 may cause a pressure drop 220 (pressure loss) between the trailing edge of the bypass stator 216 and the leading edge of the bypass strut 222.

During operation of the turbofan engine 100, it may be desirable to reduce mass flow rate in the core engine 122 by discharging some air from the core gas path 116 into the bypass duct 104. Such a discharge may reduce flow in the core engine 122 to promote the operation of the compressor section 108 within a prescribed operational envelope. This portion of air discharged into the bypass duct 104 may be bled from a location within the compressor section 108 or a location downstream of the compressor section 108 and upstream of the combustor 110 such as (immediately or further) downstream of the booster compressor.

The bleed air 208 may be discharged via a bleed air passage 206. The bleed air passage 206 may be defined between the core gas path 116 and the bypass duct 104. The bleed air passage 206 may open, at an upstream end thereof, to the core gas path 116. The bleed air passage 206 may extend at least partially in a radial direction 118 so that the upstream and downstream ends of the bleed air passage 206 are radially spaced apart relative to central axis 114. The bleed air 208 may be guided into the bypass duct 104 using one or more bleed air devices 128 to promote desirable flow conditions and reduce pressure loss.

Figure 3:
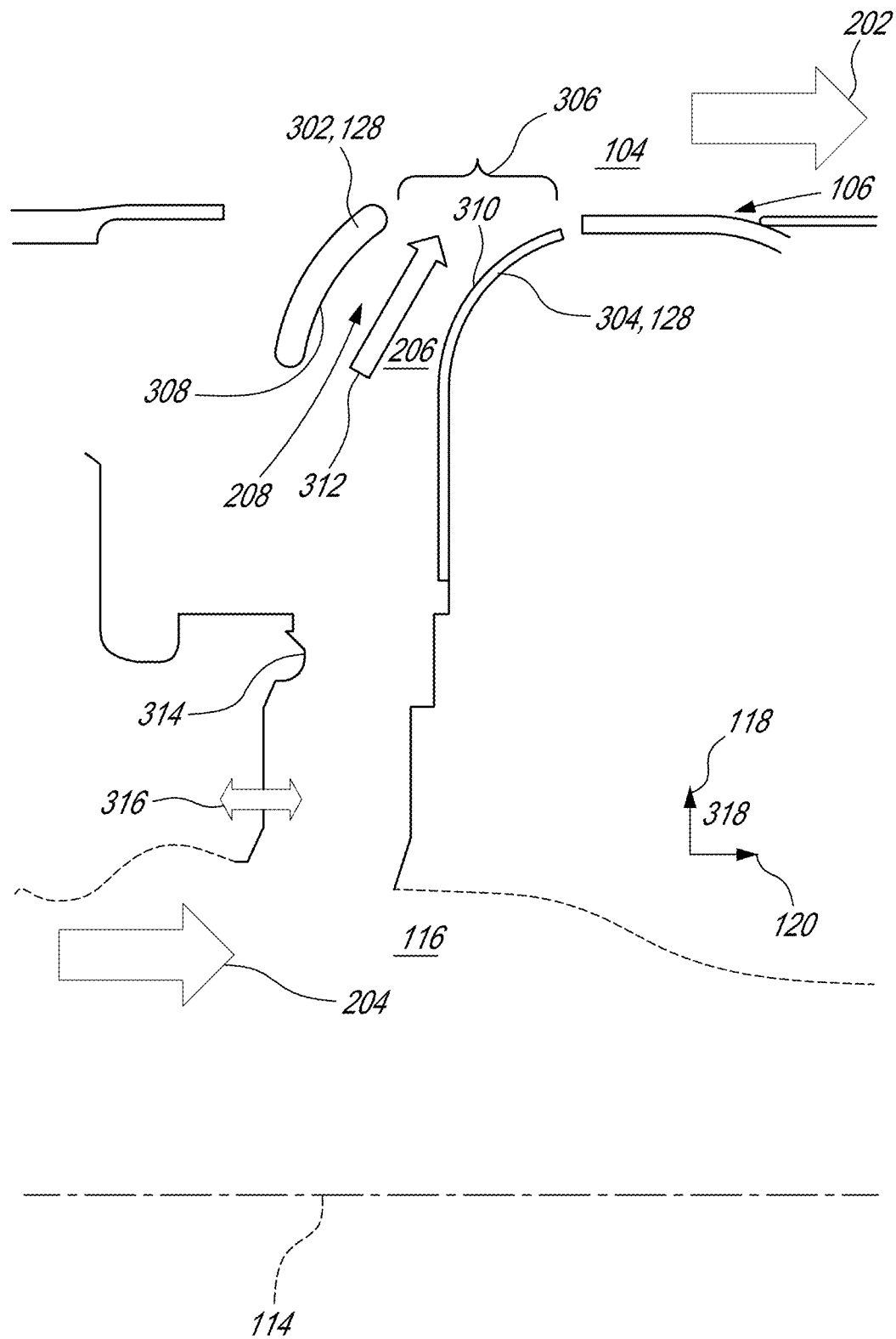
FIG. 3 is a detailed schematic view of region 300 of FIG. 2, showing a baseline bleed air passage between a core gas path and the bypass duct.

FIG. 3 is a detailed schematic view of the region 300 of FIG. 2, showing the bleed air passage 206 conveying bleed air 208 along the bleed air flow 312 from the core gas path 116 to the bypass duct 104. FIG. 3 shows a schematic cross-sectional view of a baseline configuration of the bleed air passage 206 in a plane 318 parallel to and containing the central axis 114 of the turbofan engine 100.

The bleed air passage 206 may be opened or closed via a bleed-off valve 314. The bleed-off valve 314 may comprise a movable and selectively actuatable valve member which may be opened when bleed air discharge is desired. The bleed-off valve 314 may be translatable along direction 316 to open/close the bleed air passage 206. The bleed-off valve 314 is shown as being open in FIG. 3.

The louver 302, 128 and a baffle 304, 128 may guide the bleed air 208 from the bleed air passage 206 into the bypass duct 104 via an opening 306 through the inner casing 106. The louver 302, 128 and baffle 304, 128 may include one or more bodies defining one or more flow-guiding surfaces. For example, louver 302, 128 may define a fore flow-guiding surface 308 relative to the central axis 114. The baffle 304, 128 may define an aft flow-guiding surface 310 relative to the central axis 114. The baffle 304, 128 may form a wall of the bleed air passage 206 and may guide the bleed air flow 312 toward the bypass duct 104.

Figure 4:
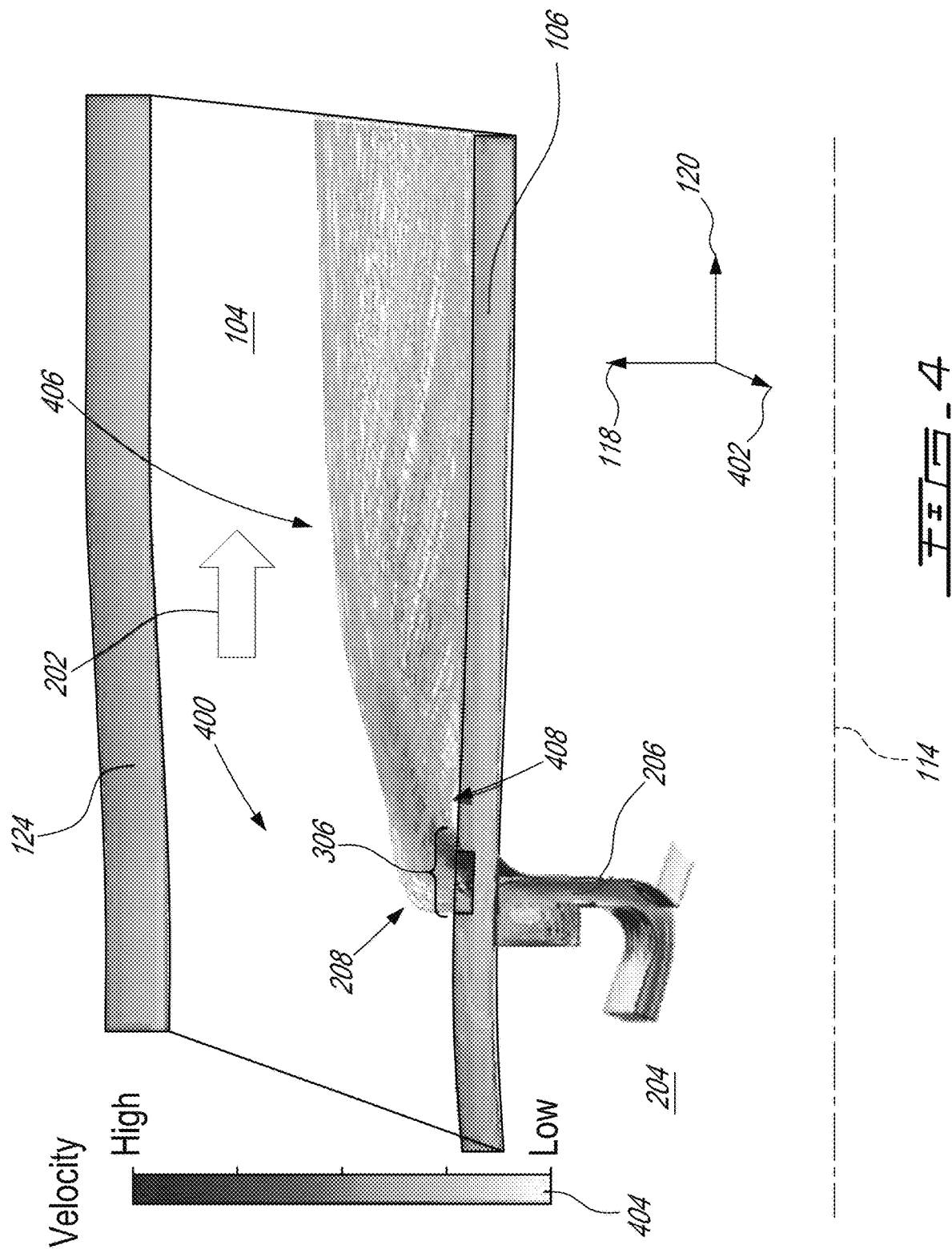
FIG. 4 is a schematic perspective view of streamlines of flow in a bleed air discharge region of the bypass duct using the bleed air passage of FIG. 3.

FIG. 4 is a schematic perspective view of streamlines 406 of flow in a bleed air discharge region 400 of the bypass duct 104 of the baseline bypass duct 206 of FIG. 3. The streamlines 406 are shaded by velocity magnitude as represented by the contour levels 404. The perspective view has primary alignment along a 2D plane containing the radial direction 118 and the axial direction 120. The streamlines 406 are shown starting in the bleed air passage 206 and extending in the bypass duct 104. A region 408 of relatively low pressure adjacent to the opening 306 may be formed. The pressure in such a region of relatively low pressure may be lower than pressure in adjacent flow volumes in the bypass duct 104 and may induce pressure loss in the bypass duct 104. The region 408 of relatively low pressure may be a flow separation zone (e.g. a recirculation bubble) adjacent to the opening 306.

Figure 5:
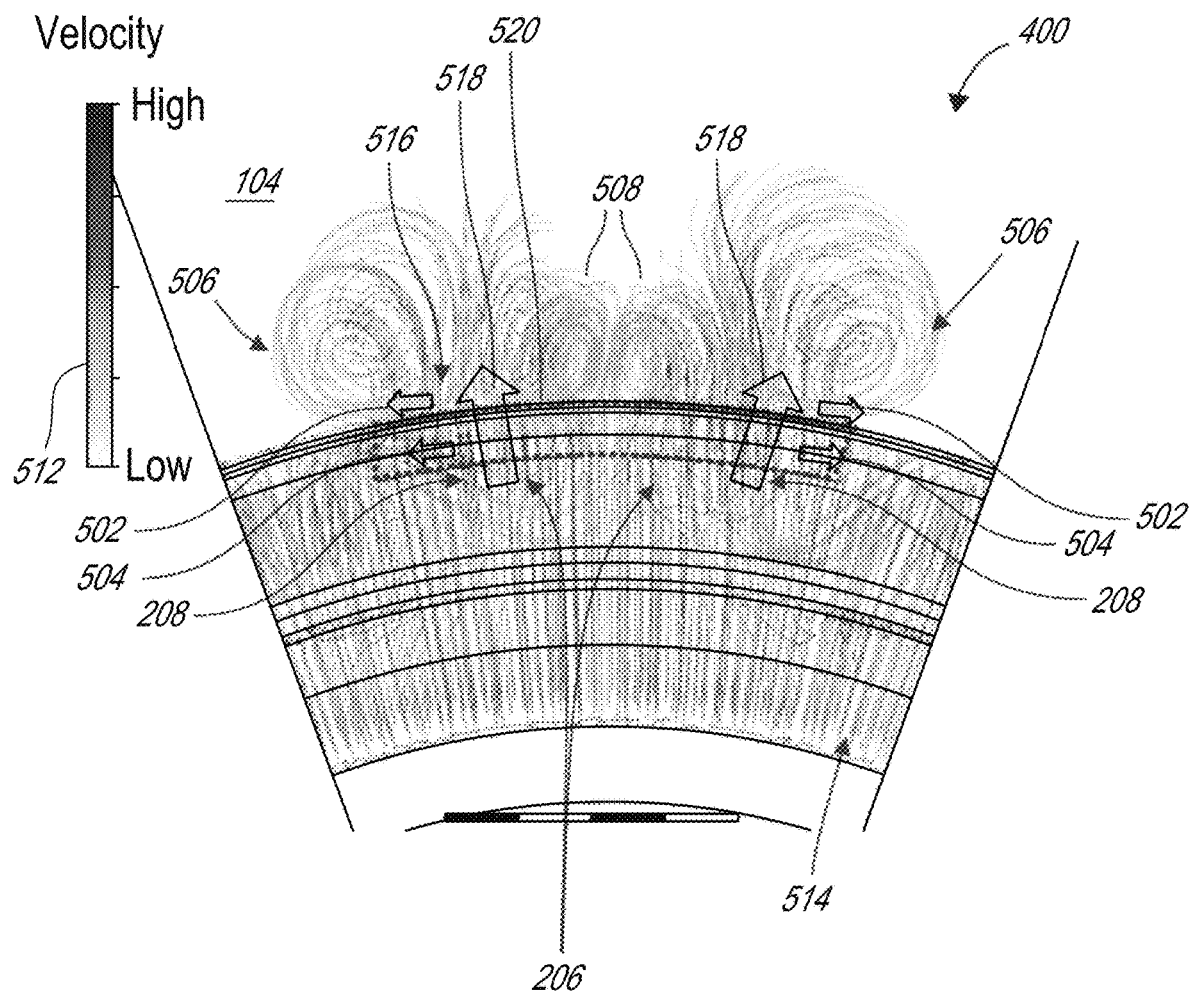
FIG. 5 is a schematic view in a forward direction of the streamlines of flow of FIG. 4.

FIG. 5 is a schematic view in the forward direction 134 of streamlines 514 of flow in the bleed air discharge region 400. The streamlines 514 are shaded by velocity magnitude as represented by the contour levels 512, and are shown in a region near the bleed air passage 206 opening into the bypass duct 104. FIG. 5 is an angular portion of an annular section of the turbofan engine 100. The bleed air passage 206 may be part of an annulus 520 extending partially around the central axis 114.

Bleed air 208 flows generally along the radial direction 118 outwardly relative to the central axis 114 towards and into the bypass duct 104 as illustrated by the streamlines 514. The bleed air 208 flowing towards the bypass duct 104 via the bleed air passage 206 may flow generally along the streamwise direction 518.

As shown by the streamlines 514, a transverse flow 516 or secondary flow lateral (e.g. substantially normal) to the streamwise direction 518 may develop as well. The transverse flow 516 may induce undesirable vortices 506 associated with pressure loss in the bypass duct 104. The transverse flow 516 may comprise internal transverse flow 504 within the bleed air passages 206 and external transverse flow 502 outside/downstream of the bleed air passages 206 in the bypass duct 104. The internal transverse flow 504 may result in internal vortical structures that may extend beyond the bleed air passage 206. The external transverse flow 502 may result in the formation of vortices 506 that may cause pressure losses in the bypass duct 104.

Various embodiments of bleed air devices 128 and methods for guiding bleed air 208 are presented below. In some embodiments, the bleed air devices 128 described herein may promote favorable flow behavior and the reduction of energy loss. In some embodiments, the bleed air devices 128 described herein may guide the flow into the bypass duct 104 in a manner that promotes more favorable flow conditions and that may reduce pressure losses in the bypass duct 104.

Figure 6:
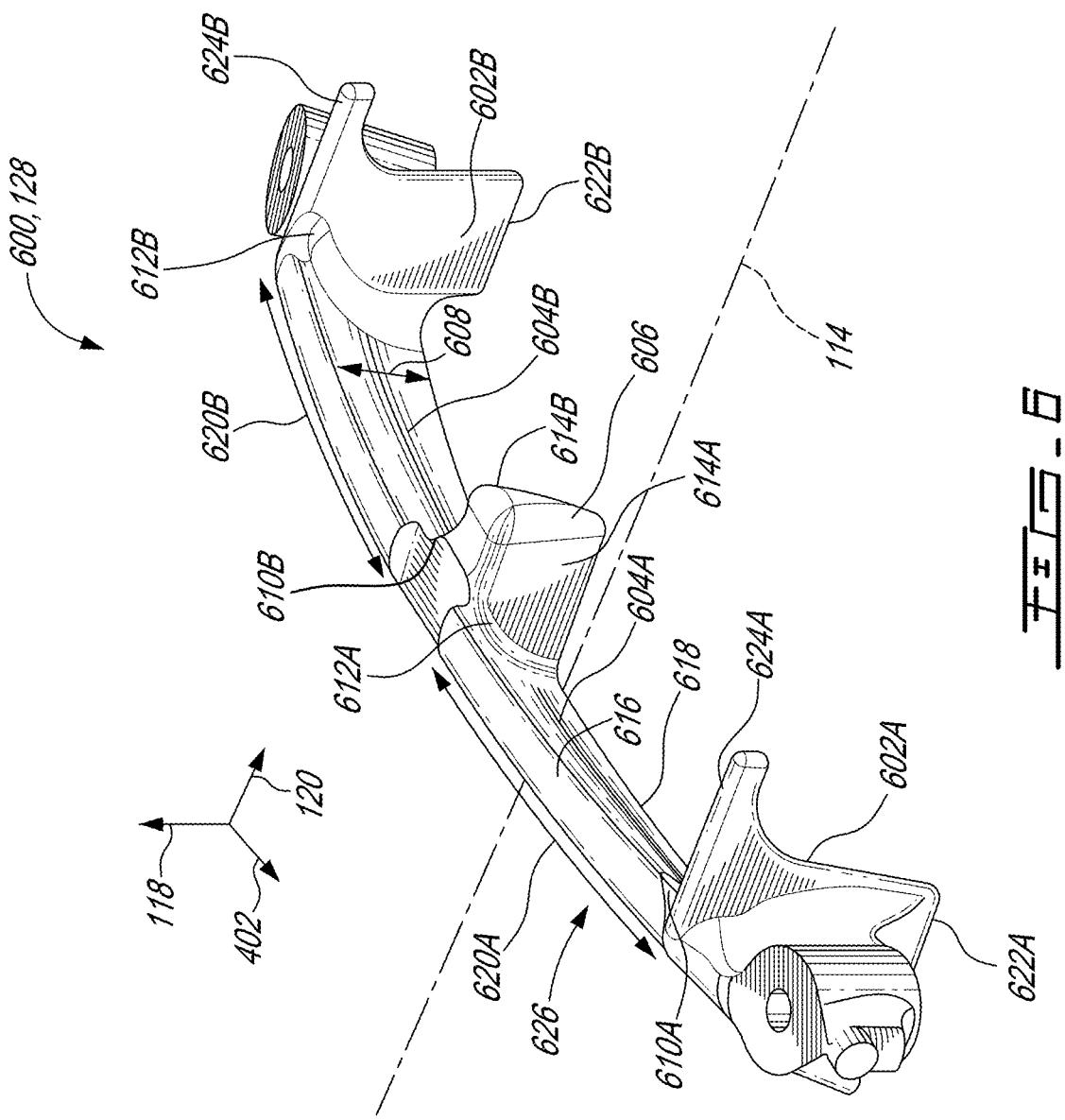
FIG. 6 is a perspective view of an exemplary bleed air device for guiding bleed air into the bypass duct of the turbofan engine.

FIG. 6 is a perspective view of an exemplary device 600, 128 for guiding bleed air 208 into the bypass duct 104 of the turbofan engine 100.

Figure 7:
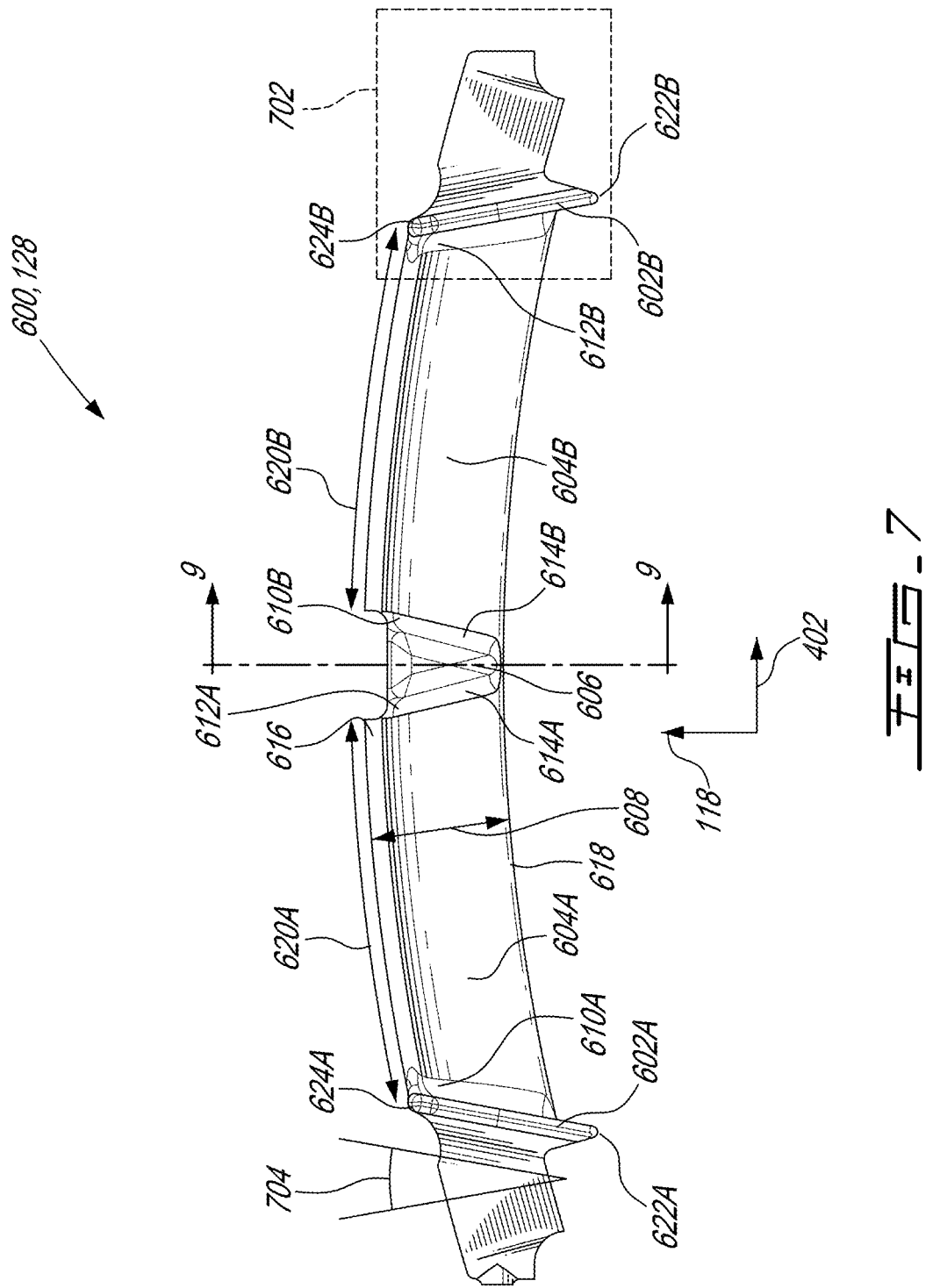
FIG. 7 is a front view of the bleed air device of FIG. 6.

FIG. 7 is a view of the device 600, 128 of FIG. 6 viewed toward the fore direction along the central axis 114 when the device 600, 128 is installed in the turbofan engine 100. In reference to FIG. 3, device 600, 128 may be a louver that is installed to replace the louver 302, 128. The device 600, 128 may define part of the radially extending bleed air passage 206 in the turbofan engine 100, between the bypass duct 104 and the core engine 122. The device 600, 128 may at least partially wrap angularly along the inner casing 106 of the turbofan engine 100 in between the core engine 122 and the bypass duct 104. The device 600, 128 may guiding bleed air 208 into the bypass duct 104.

The device 600, 128 may include a body 626 with a radially-outer edge 616 and a radially-inner edge 618, relative to the central axis 114. The radially-outer edge 616 and radially-inner edge 618 may be at least partially spaced apart in the radial direction 118 by a radial distance 608 and may also be spaced apart in the axial direction 120.

The body 626 may define a first flow-guiding surface 604A having a first end 610A and an opposite second end 612A, which may be angularly spaced apart from each other relative to the central axis 114. The body 626 may define a second flow-guiding surface 604B having a first end 610B and an opposite second end 612B, which may be angularly spaced apart from each other relative to the central axis 114. The second flow-guiding surface 604B may be angularly spaced apart from the first flow-guiding surface 604B relative to the central axis 114.

The first ends 610A, 610B and respective second ends 612A, 612B opposite thereto may define respective spans 620A, 620B of the flow-guiding surfaces 604A, 604B around the central axis 114. The flow-guiding surfaces 604A, 604B may each extend between the radially-inner edge 618 and the radially-outer edge 616 of the body 626.

In reference to the first flow-guiding surface 604A, the first end 610A may be distal to the second flow-guiding surface 604B and the second end 612A may be relatively proximal to the second flow-guiding surface 604B. In reference to the second flow-guiding surface 604B, the first end 610B may be proximal to the first flow-guiding surface 604A and the second end 612B may be relatively distal to the first flow-guiding surface 604A.

The body 626 may include a side wall 602A adjacent the first end 610A of the flow-guiding surface 604A. The first side wall 602A may extend at least partially axially relative to the central axis 114. The device 600, 128 may include a second side wall 602B adjacent the second end 612B of the second flow-guiding surface 604B. The second side wall 602B may extend at least partially axially relative to the central axis 114. In some embodiments, the second side wall 602B may be a mirror image of the first side wall 602A.

In some embodiments, one or both of the side walls 602A, 602B may be substantially parallel to the central axis 114. One or both of the side walls 602A, 602B may be substantially planar/flat. In some embodiments, one or both of the side walls 602A, 602B may be non-planar and may extend in both the angular direction 402 and the axial direction 120. In some embodiments, one or both of the side walls 602A, 602B may be curved and/or may be non-parallel to the radial direction 118.

One or both of the side walls 602A, 602B may extend from a respective first position 622A, 622B radially inwardly of the radially-inner edge 618 to a respective second position 624A, 624B radially outwardly of the radially-inner edge 618 relative to the central axis 114. One or both of the side walls 602A, 602B may extend radially (in the radial direction 118) towards the central axis 114 beyond the radially-inner edge 618 of the body 626. The side walls 602A, 602B may extend radially outwardly to the radially-outer edge 616 of the body 626.

The side walls 602A, 602B may define part of the bleed air passage 206 and may each block or hinder some transverse flow in the bleed air passage 206. One or both of the side walls 602A, 602B may be formed continuously with the radially-inner edge 618 via a blended corner disposed at each of the first end 610A and the second end 612B. One or both of the side walls 602A, 602B may terminate at the respective first position 622A, 622B. One or both of the second positions 624A, 624B may be adjacent the radially-outer edge 616 of the body 626. In some embodiments, one or both of the second positions 624A, 624B may be disposed radially inwardly of the radially-outer edge 616 of the body 626. In some embodiments, one or both of the second positions 624A, 624B may be disposed radially inwardly of, or at the same radial position as the radially-outer edge 616 of the body 626. In some embodiments, one or both of the first positions 622A, 622B may be radially inward of the radially-inner edge 618 by an amount between 5% and 100% of the radial distance 608 between the radially-inner edge 618 and the radially-outer edge 616. In some embodiments, one or both of the first positions 622A, 622B may be radially inward of the radially-inner edge 618 by an amount between 10% and 50% of the radial distance 608 between the radially-inner edge 618 and the radially-outer edge 616.

Each or both of the side walls 602A, 602B may be inclined at an inclination angle 704 relative to the radial direction 118. In some embodiments, the inclination angle 704 may be between 0 and 45 degrees. Each or both of the side walls 602A, 602B may be inclined towards each other in the radially-outward direction so that radially outward ends of the side walls 602A, 602B may be angularly closer to each other than their radially inward ends.

The device 600, 128 may include a third side wall 614A adjacent the second end 612A of the first flow-guiding surface 604A of the body 626. The device 600, 128 may include a fourth side wall 614B adjacent the first end 610B of the second flow-guiding surface 604B of the body 626. One or both of the third and fourth side walls 614A, 614B may extend at least partially axially relative to the central axis 114. One or both of the third and fourth side walls 614A, 614B may be substantially planar and divergent relative to each other in a radially outward direction relative to the central axis 114. For example, the side walls 614A, 614B may be oriented so that radially inward ends of the side walls 614A, 614B may be closer to each other than their radially outward ends relative to the central axis 114. In other words, the third and fourth sidewalls may cooperatively define a V-shaped center piece 606 that is pointing radially-inwardly. The center piece 606 may be positioned between first and second flow-guiding surfaces 604A, 604B.

Figure 12:
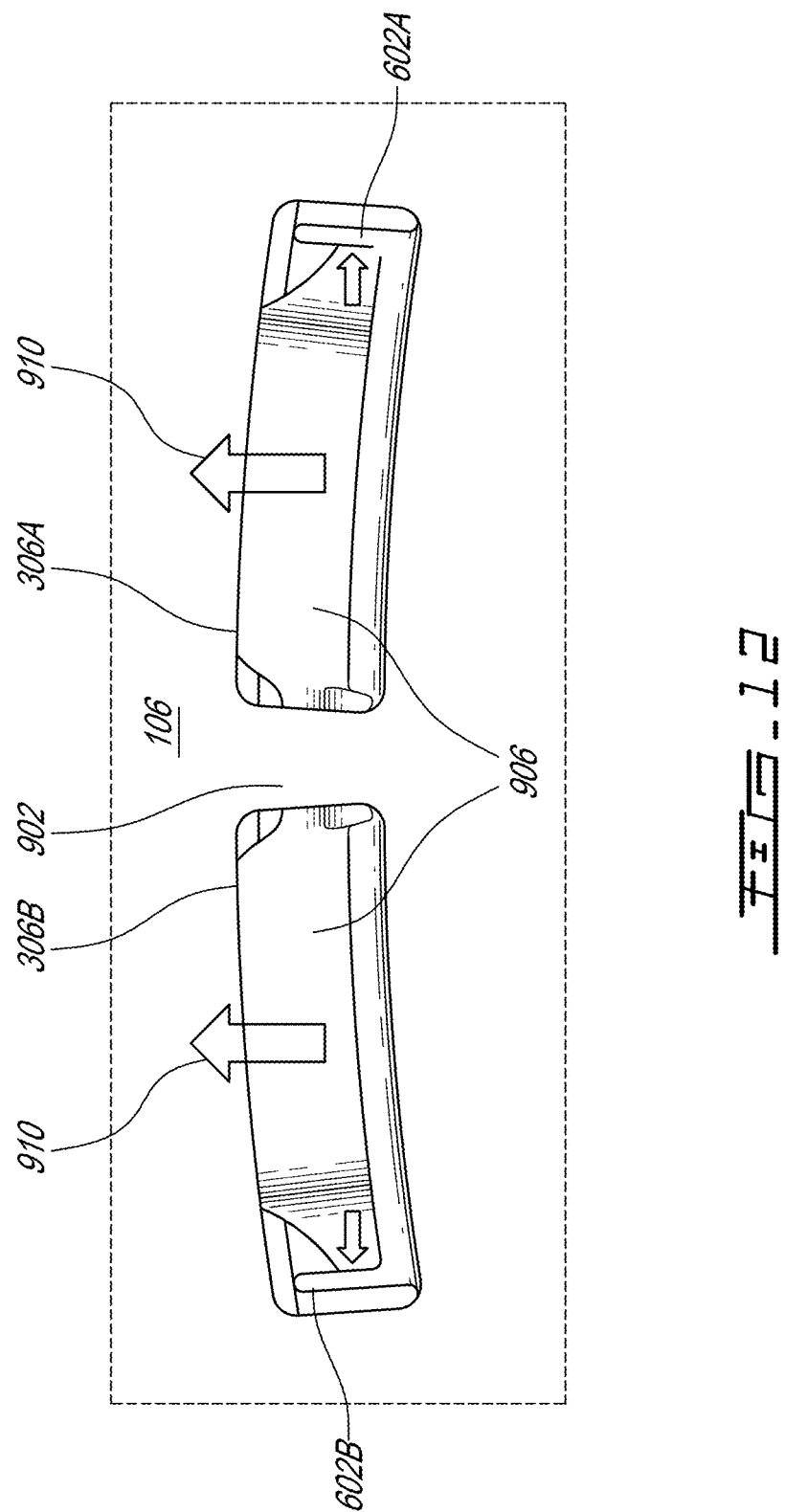
FIG. 12 is a radially-inward view of two openings of the bleed air passage to the bypass duct of the turbofan engine equipped with the bleed air device of FIG. 6.

When the device 600, 128 is installed in the turbofan engine 100, the center piece 606 may be substantially aligned with the bridge 902 defined in the inner casing 106 between the openings 306A, 306B (see FIG. 12). The center piece 606 may direct the flow around the bridge 902 as the bleed air 208 flows towards the bypass duct 104. In some embodiments, the center piece 606 may help reduce transverse flows in the bleed air 208.

One or more of the side walls 602A, 602B may have a unitary construction with the body 626 or may be separately-manufactured components that are subsequently assembled with the body 626 via fasteners or other means. As referred to herein, a unitary construction refers to a construction of the two parts wherein each is fused or melded to the other to form a single entity. For example, in some embodiments, one or more of the side walls 602A, 602B may be manufactured together with the body 626 as a single piece. In some embodiments, the center piece 606 may have a unitary construction with the body 626. The device 600, 128 may be manufactured by injection molding, casting, additive manufacturing, welding, machining and/or brazing. In various embodiments, the device 600, 128 may be made of a suitable metallic material, polymer or fibre-reinforced composite material for example.

In some embodiments, any of the side walls 602A, 602B and center piece 606 may be separate from the body 626. For example, any of the side walls 602A, 602B and the center-piece 606 may be integrated with and/or have a unitary construction with the inner casing 106. In various embodiments, some or all of device 600, 128 may be integrated with and/or have a unitary construction with the inner casing 106. The device 600, 128 may have a different number of side walls and center pieces than those illustrated herein.

Figure 8:
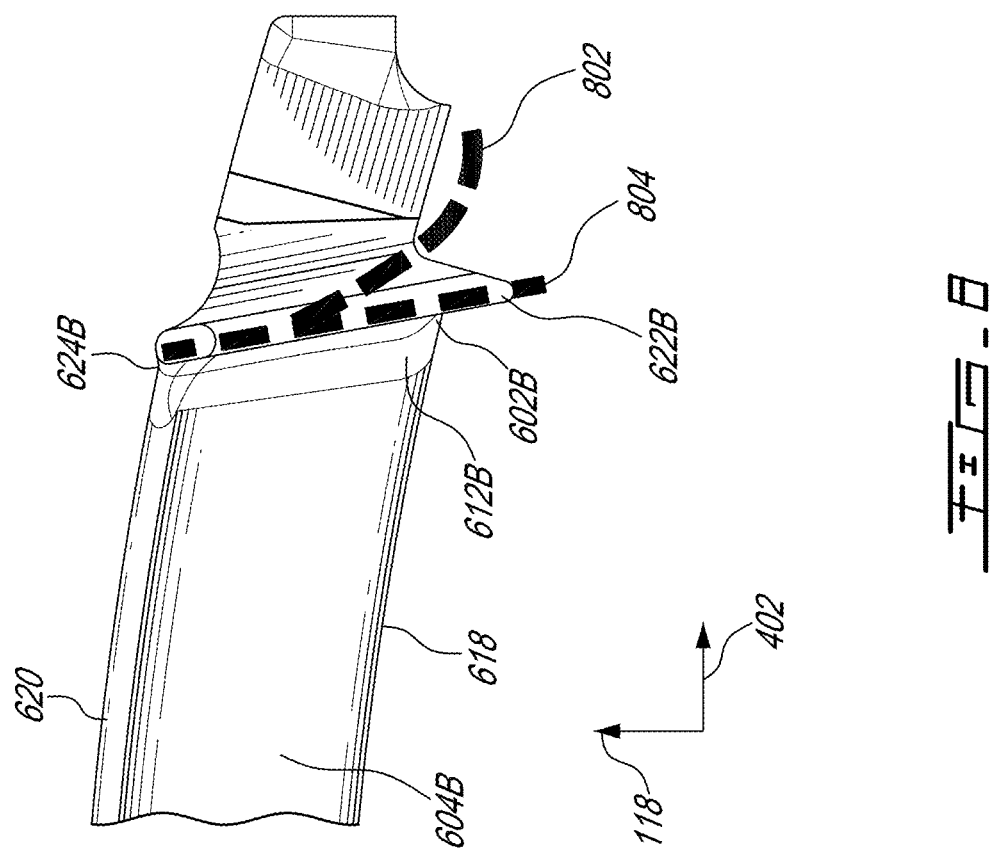
FIG. 8 is an enlarged view of region 702 of FIG. 7 showing a side wall of the bleed air device of FIG. 6.

FIG. 8 is an enlarged view of the region 702 of FIG. 7 showing the side wall 602B of the device 600, 128. The side wall 602B in FIG. 7 is viewed substantially along the central axis 114. The side wall 602A may be a mirror image of the sidewall 602B about the center piece 606. The side wall 602B when viewed along the central axis 114 may have a linear profile 804. The linear profile 804 may be inclined relative to a radial direction to central axis 114.

In some embodiments, the side walls 602A, 602B may have a rounded or curved profile such as a Bellmouth profile 802, or bell-shaped profile, when viewed along the central axis 114. The Bellmouth profile 802 may smoothly or tangentially transition to a linear (or straight) profile at a radially outer end of the side wall 602B. The radially outer end of the Bellmouth profile 802 may be inclined at an angle 704 between 0 and 45 degrees, similar to the inclination of the linear profile 804 as shown in FIG. 7.

The body 626 may comprise a single row of angularly-spaced apart flow-guiding surfaces 604A, 604B (or vanes, or airfoil-shaped bodies, or aerodynamic surfaces) in the axial direction 120. In some embodiments, the side walls 602A, 602B may not provide significant structural support but may help reduce transverse flows by modifying the flow in the bleed air passage 206.

Figure 9:
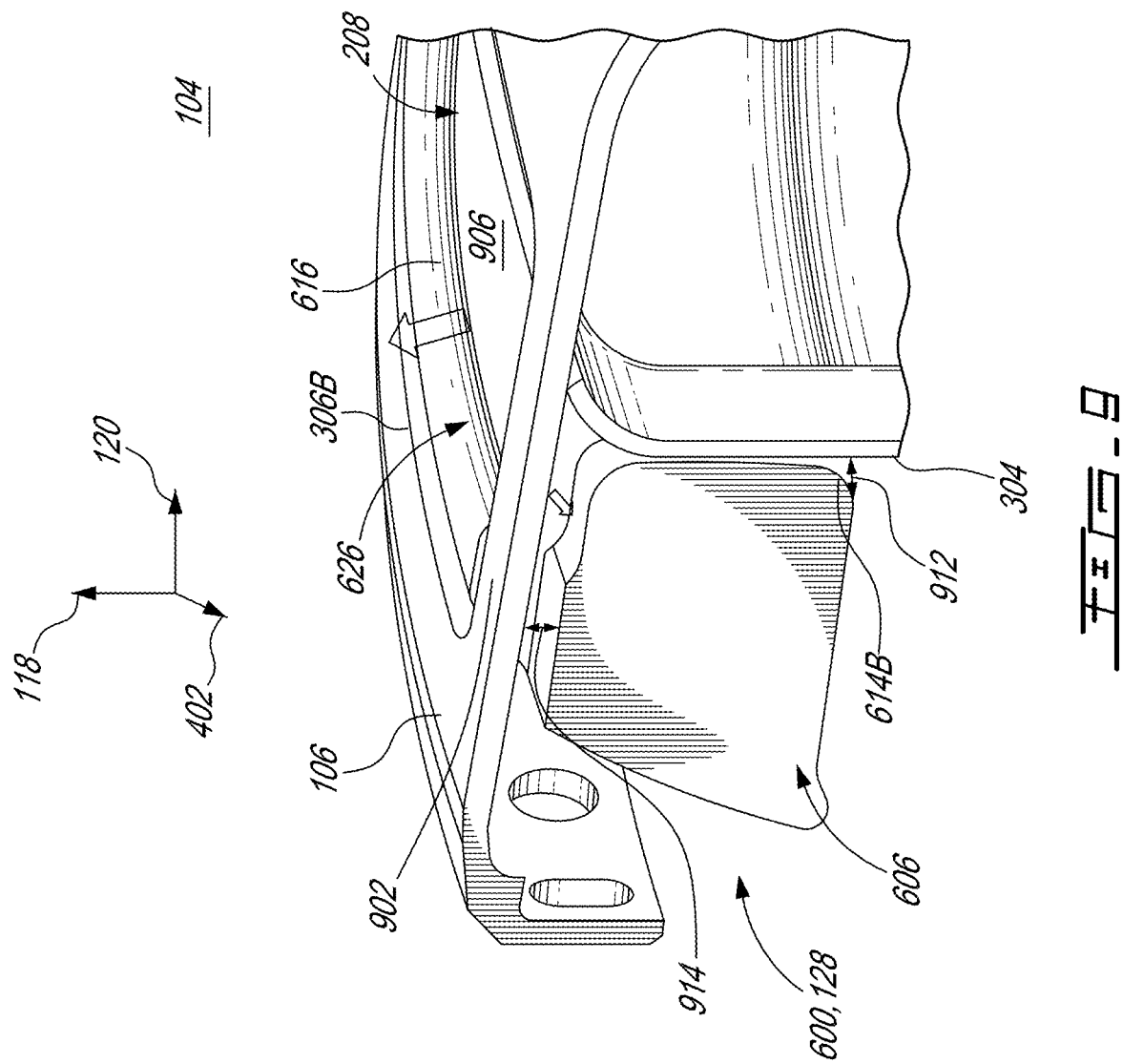
FIG. 9 is a perspective view along a cross-section taken along line 9-9 of FIG. 7 of a portion of the turbofan engine equipped with the bleed air device of FIG. 6.

FIG. 9 is a perspective view along a cross-section taken along line 9-9 of FIG. 7 of a portion of the turbofan engine 100 equipped with the device 600, 128 disposed in the inner casing 106 opposite the baffle 304, 128. The device 600, 128 may be used in conjunction with the baffle 304, 128 (shown in FIG. 3) or other baffles described herein.

Figure 10:
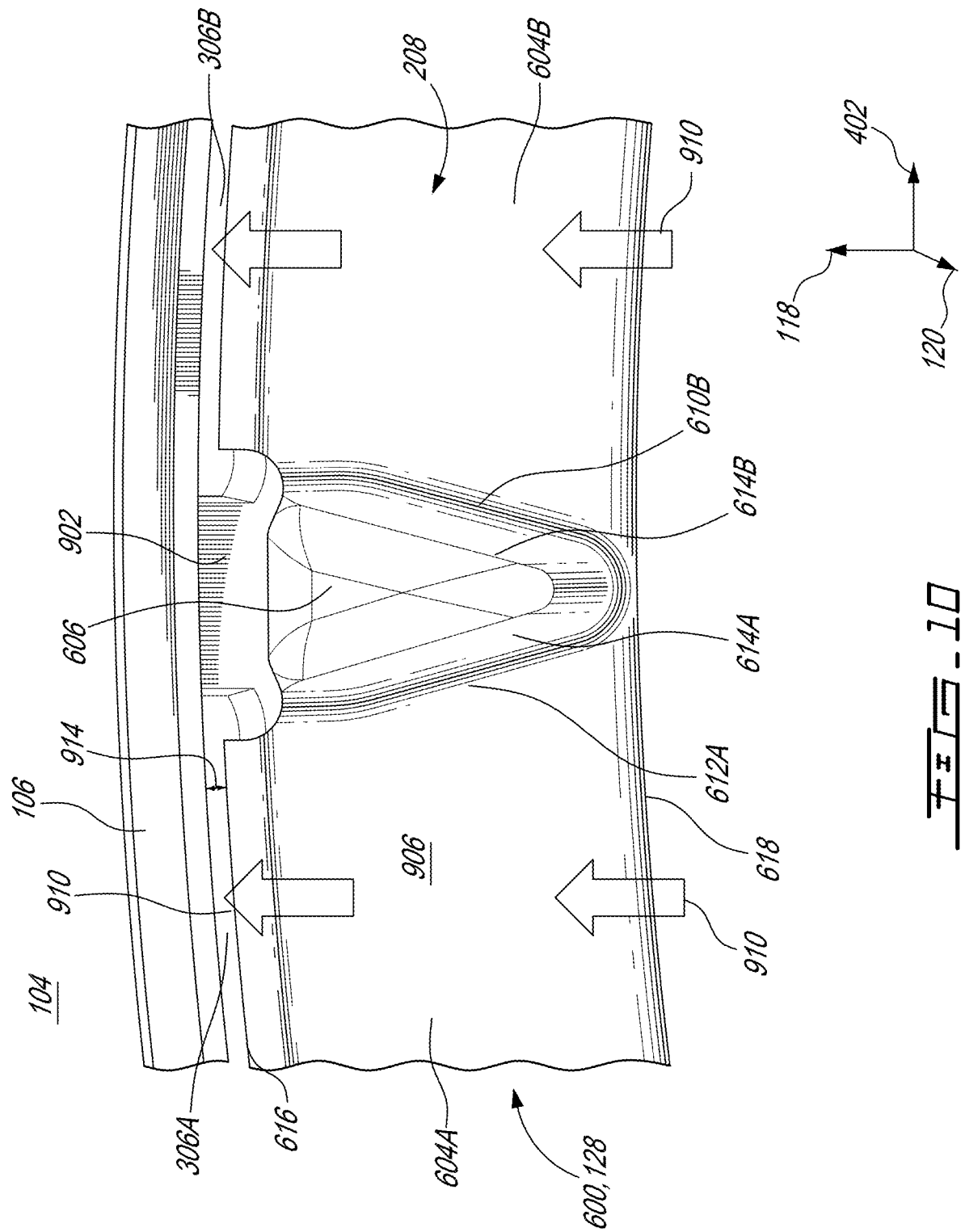
FIG. 10 is another perspective view of a portion of the turbofan engine of FIG. 9 showing the bleed air device of FIG. 6.

FIG. 10 is another perspective view of a portion of the turbofan engine 100 of FIG. 9 showing the device 600, 128.

Figure 11:
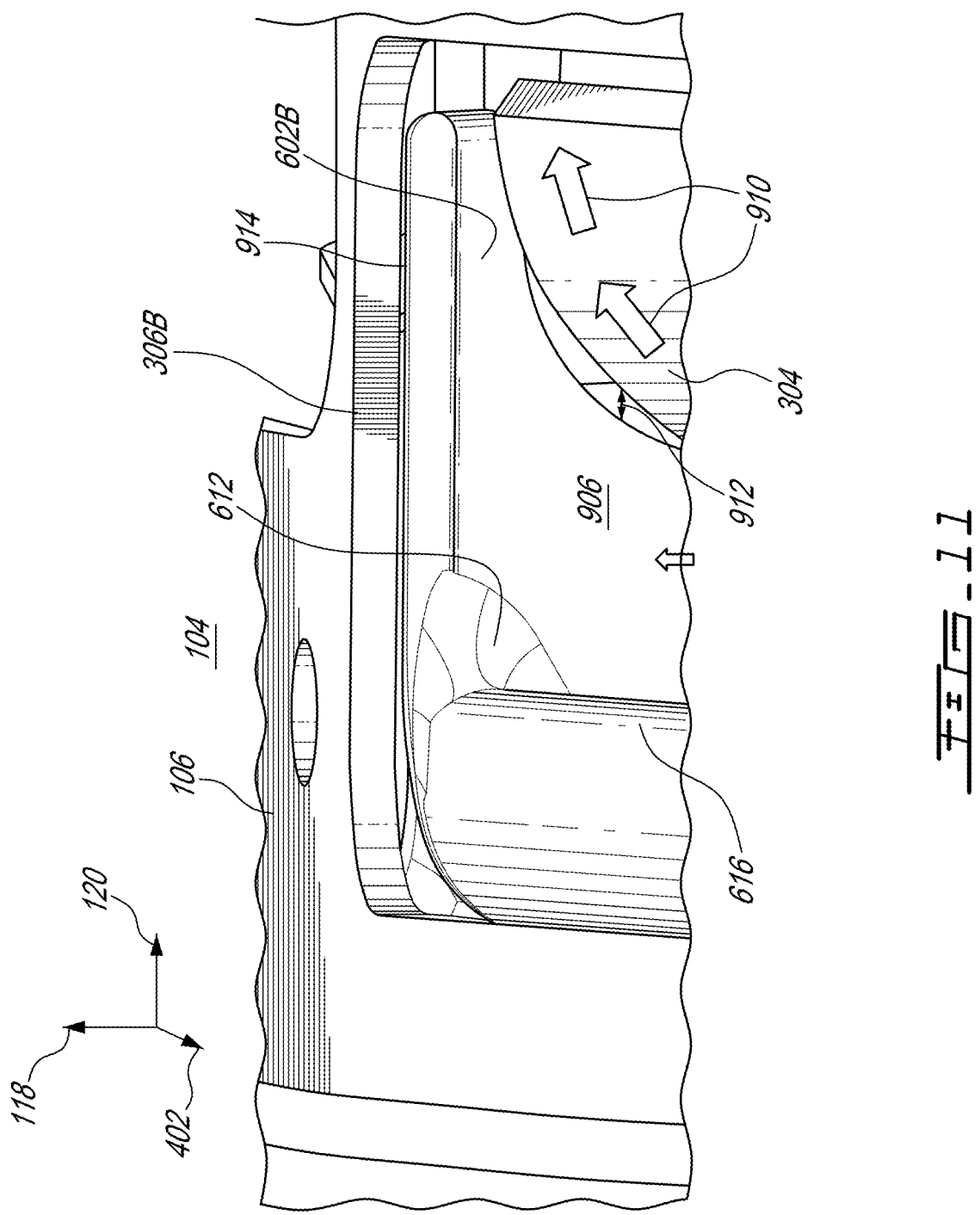
FIG. 11 is another perspective view of a portion of the turbofan engine of FIG. 9, showing a detailed view of an end of the bleed air device of FIG. 6 adjacent to the casing.

FIG. 11 is another perspective view of a portion of the turbofan engine 100 of FIG. 9, showing a detailed view of an end of the device 600, 128 adjacent to the inner casing 106. In relation to FIGS. 9-11, the device 600, 128 may guide bleed air 208 immediately before the bleed air 208 enters the bypass duct 104 via the openings 306A, 306B formed in the inner casing 106.

The device 600, 128 may define part of a bleed air passage 906 in cooperation with the axially spaced apart baffle 304, 128 to form one or more channels for conveying bleed air 208 towards the bypass duct 104. For example, one or both of the flow-guiding surfaces 604A, 604B may define a wall of the bleed air passage 906 while the baffle 304, 128 may form an opposing wall of the bleed air passage 906.

In some embodiments, the device 600, 128 may be adapted to the inner casing 106 to form a substantially continuous wall of the bleed air passage 906. In some embodiments, gaps may be formed between the device 600, 128 and adjacent components to prevent contact/fretting between parts during operation. For example, a gap 912 may be defined between the center piece 606 and the baffle 304, 128. Another gap 914 may be defined between the center piece 606 and the inner casing 106.

The baffle 304, 128 and the flow-guiding surfaces 604A, 604B may be spaced apart in the axial direction 120. The flow-guiding surfaces 604A, 604B may be concave relative to the bleed air passage 906 and may respectively guide bleed air 208 to respective openings 306A, 306B formed in the inner casing 106. A plurality of devices 600, 128 may be circumferentially distributed about the central axis 114 and be associated with respective bleed air passages 906 also circumferentially distributed about the central axis 114.

The flow-guiding surfaces 604A, 604B may have leading edges adjacent the radially-inner edge 618 of the body 626 and may have trailing edges adjacent the radially-outer edge 616 of the body 626. A general flow direction of the bleed air 208 is indicated at 910 in FIGS. 10 and 11. The expression "general flow direction" as used herein is intended to refer to a main or overall streamwise direction of flow of the fluid in question. The general flow direction of the bleed air 208 may vary along the bleed air passage 906. The general flow direction of the bleed air 208 may have both radial and axial components relative to the engine 100.

FIG. 12 shows the openings 306A, 306B of the bleed air passage 906 to the bypass duct 104 in conjunction with the device 600, 128. FIG. 12 represents a radially-inward view of the openings 306A, 306B from within the bypass duct 104.

Figure 13:
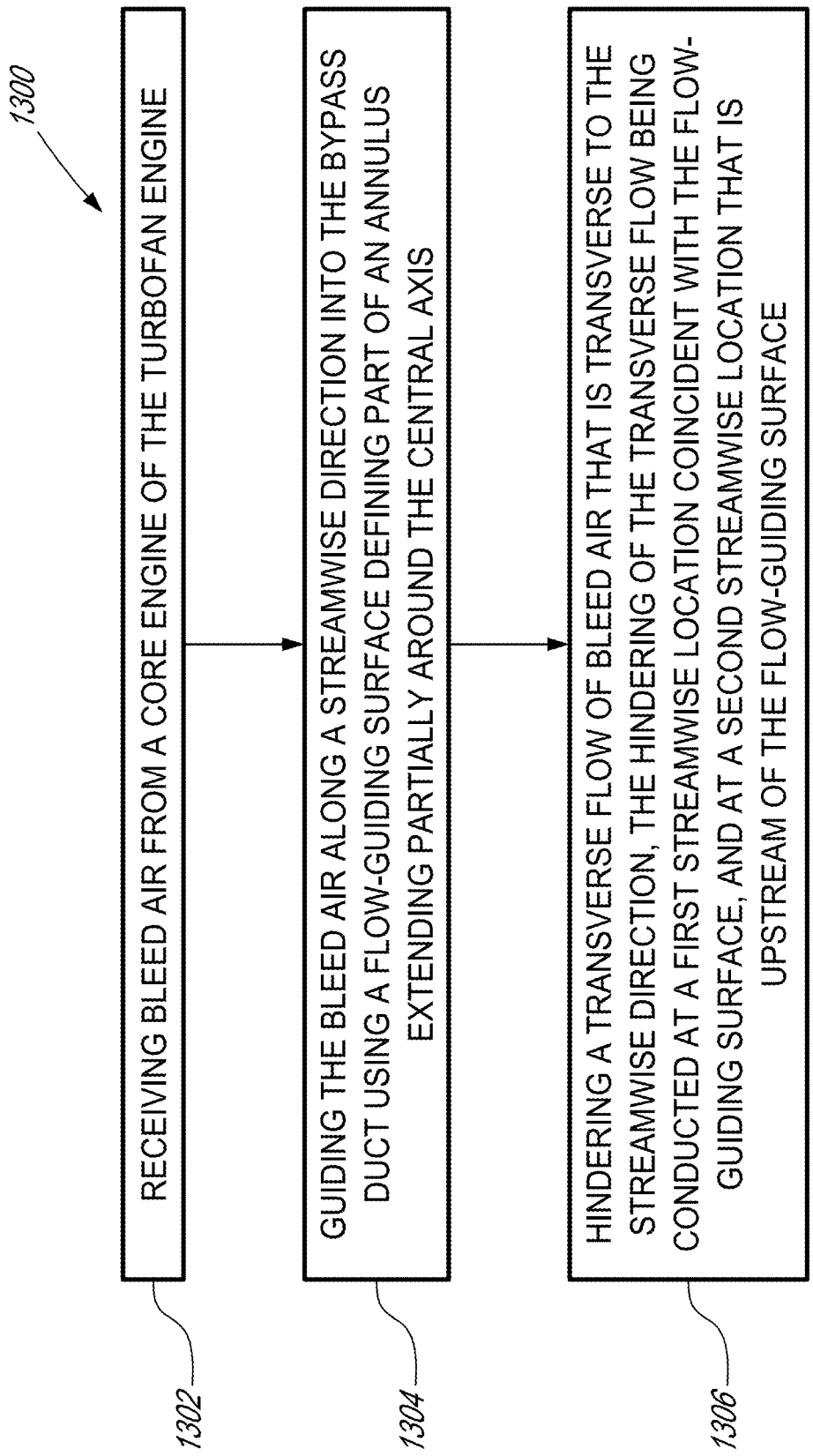
FIG. 13 is a flow chart of a method of operating the turbofan engine.

FIG. 13 is a flow chart of a method 1300 of operating the turbofan engine 100. In some embodiments, the method 1300 may be carried out using device 600, 128. Aspects of the method 1300 may be combined with aspects of other methods described herein. In reference to the figures described above, the method 1300 may include: receiving bleed air 208 from the core engine 122 of the turbofan engine 100 (block 1302); guiding the bleed air 208 along a streamwise direction 518 into the bypass duct 104 using a flow-guiding surface 604A and/or 604B defining part of the annulus 520 extending partially around the central axis 114 of the turbofan engine 100 (block 1304); and hindering the transverse flow 516 of bleed air 208 that is transverse to the streamwise direction 518, the hindering of the transverse flow 516 being conducted at a first streamwise location coincident with the flow-guiding surface 604A, and at a second streamwise location that is upstream of the flow-guiding surface 604A (block 1306). The first streamwise location may be proximal to or adjacent to the radially-inner edge 618 of the device 600, 128. The hindering of the transverse flow 516 of bleed air 208 may be performed using one or more side walls 602A, 602B, 614A, 614B.

Figure 14:
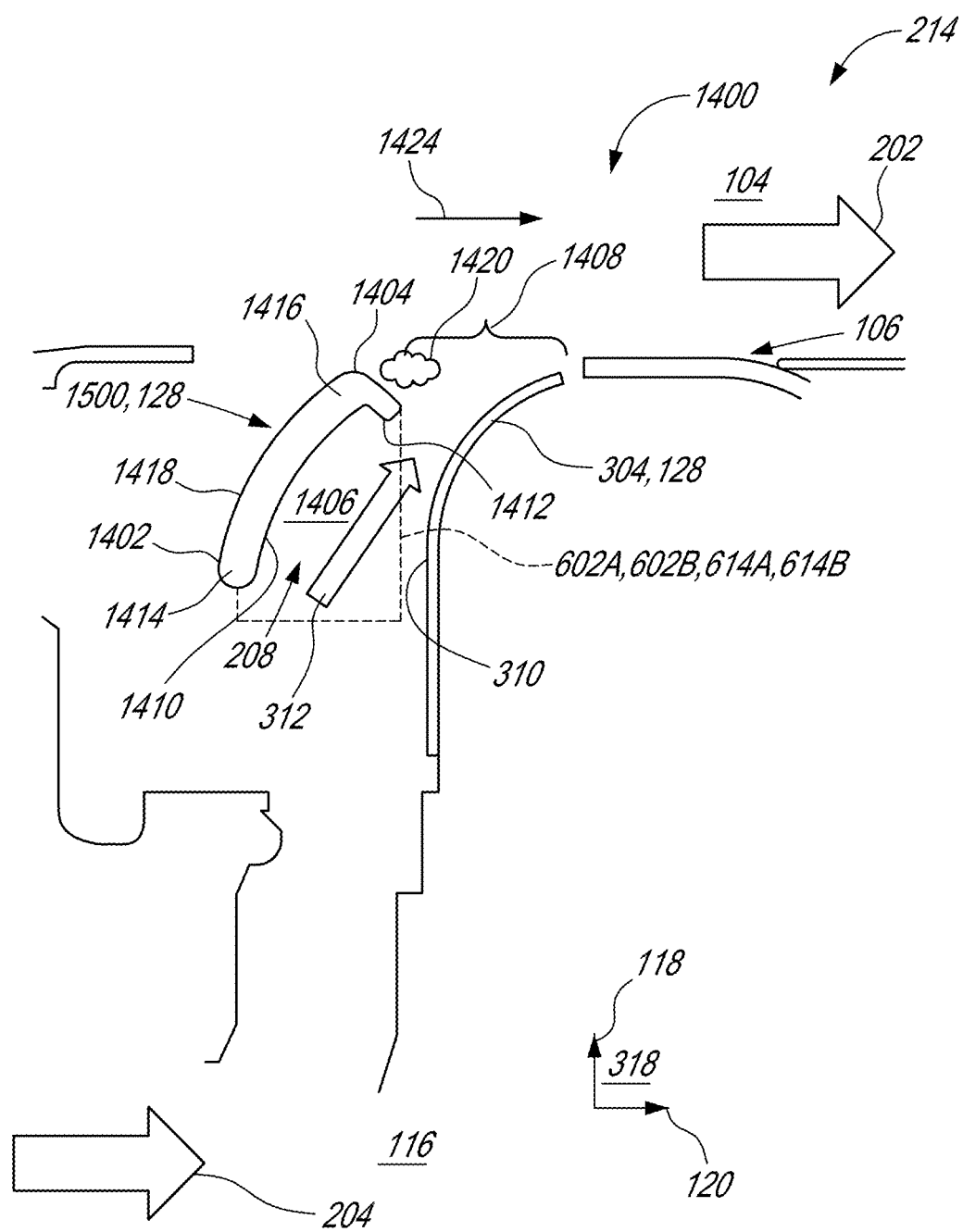
FIG. 14 is a schematic cross-sectional view of another exemplary bleed air device in a plane parallel to and containing a central axis of the turbofan engine.

FIG. 14 is a schematic cross-sectional view of an exemplary louver 1500, 128 of the turbofan engine 100 taken in the plane 318 parallel to and containing the central axis 114. As shown in stippled lines, the louver 1500 may also include one or more side walls 602A, 602B, 614A, 614B of the device (e.g., louver) 600 (shown in FIG. 6).

Figure 15:
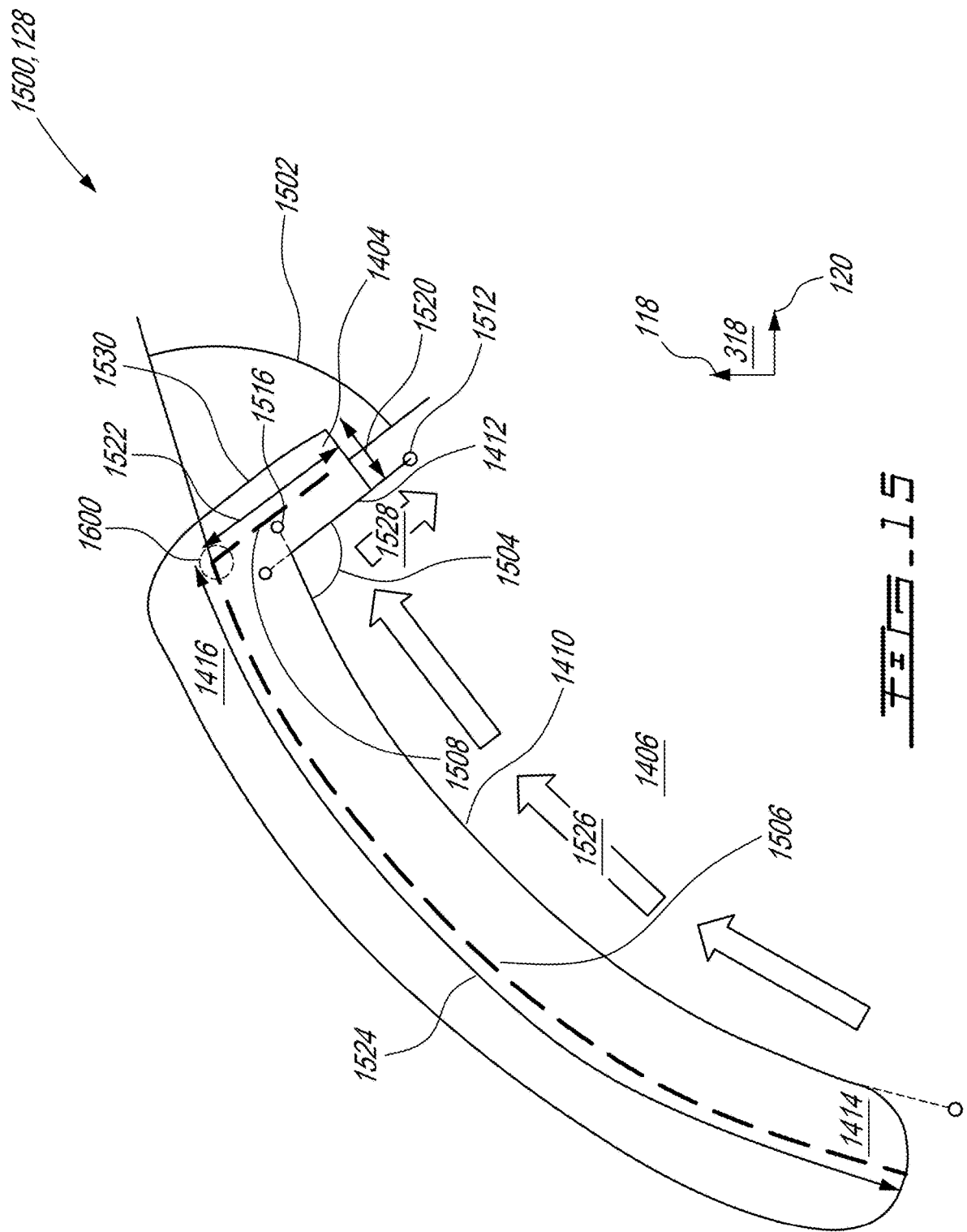
FIG. 15 is an enlarged view of the bleed air device of FIG. 14.

FIG. 15 is an enlarged view of the louver 1500, 128. The louver 1500, 128 may partially defines the bleed air passage 1406 conveying the bleed air 208 toward the bypass duct 104. The louver 1500, 128 may comprise a structure with a break in a camber line near its trailing edge. The break forms a protrusion in the bleed air passage 1406 that narrows the bleed air flow 312 path into the bypass duct 104. For example, a portion 1404 of the louver 1500, 128 jutting out into the bleed air passage 1406 at the trailing end of the louver 1500, 128 may partially block the flow of bleed air 208 and narrow the bleed air passage 1406 defined between the louver 1500 and the baffle 304, 128. The protruding portion 1404 of the louver 1500, 128 can lead to generation of one or more relatively low pressure regions 1420 downstream of the louver 1500, 128. The region 1420 may promote attachment of the bypass air 214 to the inner casing 106.

The louver 1500, 128 may include an upstream portion 1402 disposed upstream of the protruding portion 1404. The upstream portion 1402 may define a leading end 1414 and a trailing end 1416. The protruding portion 1404 may be adjacent the trailing end 1416 of the upstream portion 1402. The upstream portion 1402 and protruding portion 1404 may have a unitary construction. The upstream portion 1402 may define a flow-guiding surface 1410. The flow-guiding surface 1410 may define part of the bleed air passage 1406.

The upstream portion 1402 may have a first camber line 1506 extending between the leading end 1414 and the trailing end 1416. The protruding portion 1404 may have a second camber line 1508. Camber lines 1506 and 1508 may be respective lines joining the leading and trailing edges of an airfoil equidistant from the opposed upper and lower surfaces. In the case of the first camber line 1506, the two opposed surfaces may be outer surface 1418 and inner flow-guiding surface 1410 of the louver 1500, 128. In the case of the second camber line 1508, the two opposed surfaces may be the inner protruding surface 1412 and an outer surface 1530. The first camber line 1506 may be curved or arcuate. The second camber line 1508 may be substantially linear. In some embodiments, the second camber line 1508 may be curved or arcuate.

Figure 16:
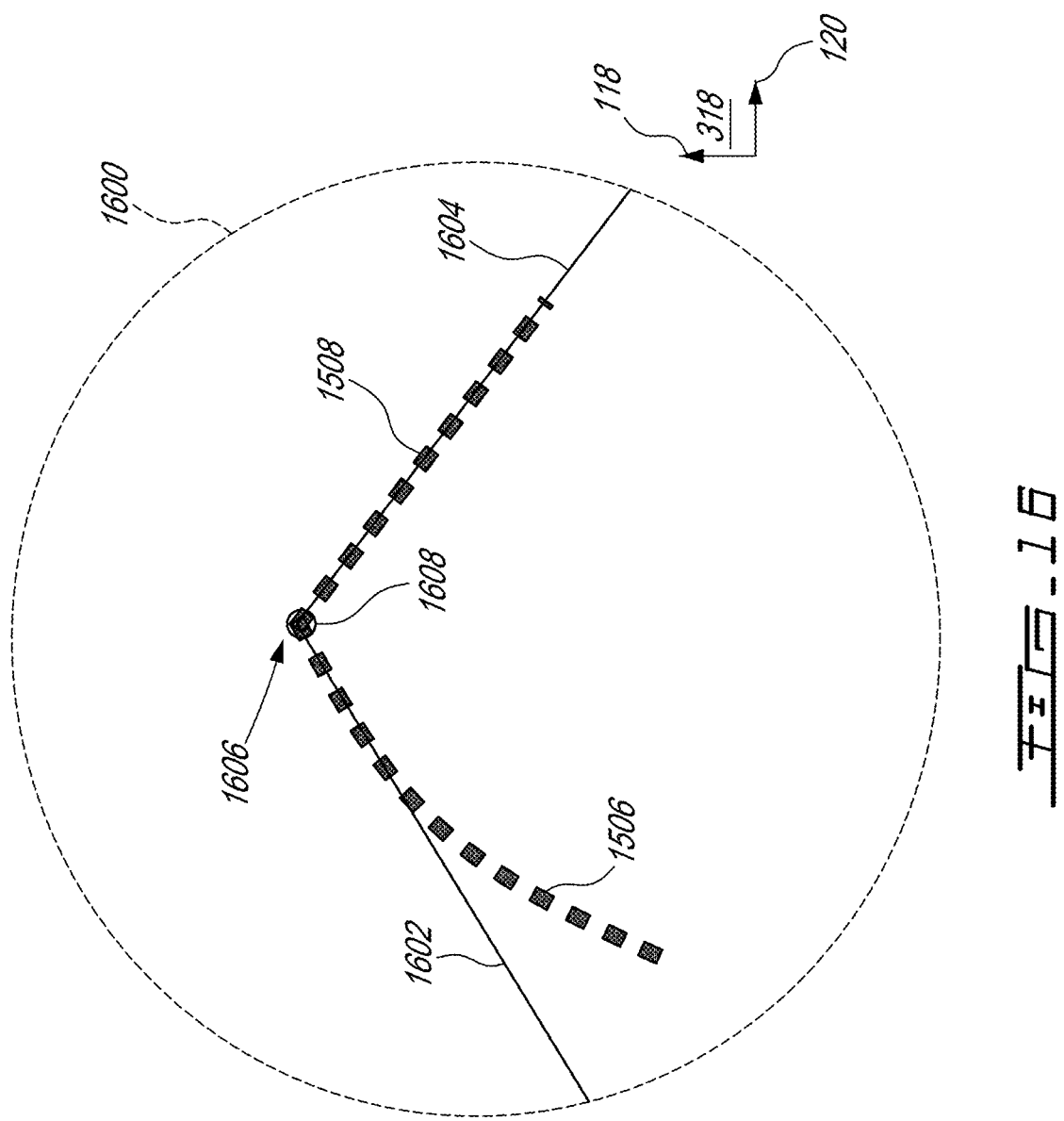
FIG. 16 is an enlarged view of a camber line intersection region 1600 of FIG. 15.

FIG. 16 is an enlarged view of a camber line intersection region 1600 of FIG. 15. An intersecting angle 1502 (shown in FIG. 15) may be defined between a tangent line 1602 of the first camber line 1506 and a tangent line 1604 of the second camber line 1508 at an intersection point 1606. In various embodiments, the intersecting angle 1502 (shown in FIG. 15) may be between 45 and 135 degrees.

In some embodiments, a length 1522 of the second camber line 1508 may be between 4% and 40% of a sum of a length 1524 of the first camber line 1506 and a length 1522 of the second camber line 1508. In some embodiments, a width 1520 of the protruding portion 1404 measured transversely to the second camber line 1508 may be between 2% and 40% of a sum of the length 1524 of the first camber line 1506 and the length 1522 of the second camber line 1508.

The second camber line 1508 of protruding portion 1404 (shown in FIG. 15) may form a discontinuity 1608 in tangency with the first camber line 1506. For example, the tangent line 1602 and tangent line 1604 may have different slopes. The discontinuity 1608 may occur between an end of the second camber line 1508 closest to the first camber line 1506 and an end of the first camber line 1506 closest to the second camber line 1508, e.g. the intersection point 1606.

In reference to FIG. 15, the protruding surface 1412 may be adjacent the flow-guiding surface 1410. The protruding surface 1412 may have curvature different than the curvature of the flow-guiding surface 1410. The curvature may be an average curvature or may be considered at a particular position, e.g. the intersection point 1606. The flow-guiding surface 1410 may have a curved cross-sectional profile 1516 and the protruding surface 1412 may have a linear cross-sectional profile 1512, in the plane 318. The profiles are shown in FIG. 15 extending from the louver 1500, 128 as dashed lines with circle markers. The protruding surface 1412 may intersect the flow-guiding surface 1410 and may be oriented at an angle 1504 between 45 and 135 degrees to the flow-guiding surface 1410.

In reference to FIGS. 14 and 15, the flow-guiding surface 1410 may guide the bleed air 208 received from the core engine 122 toward a general bypass flow direction 1424 (shown in FIG. 14) of bypass air flowing into the bypass duct 104, resulting in a guided flow 1526 that tends towards the general bypass flow direction 1424. The protruding portion 1404 may cause the bleed air 208 to swerve by providing an abrupt or steep flow obstruction. The resulting diverted flow 1528 may flow around the protruding portion 1404 before entering the bypass duct 104. In various embodiments, the swerving may include guiding some of the bleed air 208 away from the bypass duct 104. In some embodiments, swerving may include momentarily guiding some of the bleed air 208 towards the central axis 114 before allowing the bleed air 208 to enter the bypass duct 104. The protruding portion may create a region 1420 of relatively low pressure downstream of the louver 1500, 128. In some situations, the region 1420 of low pressure may draw the bypass flow 202 toward the inner casing 106.

Figure 17:
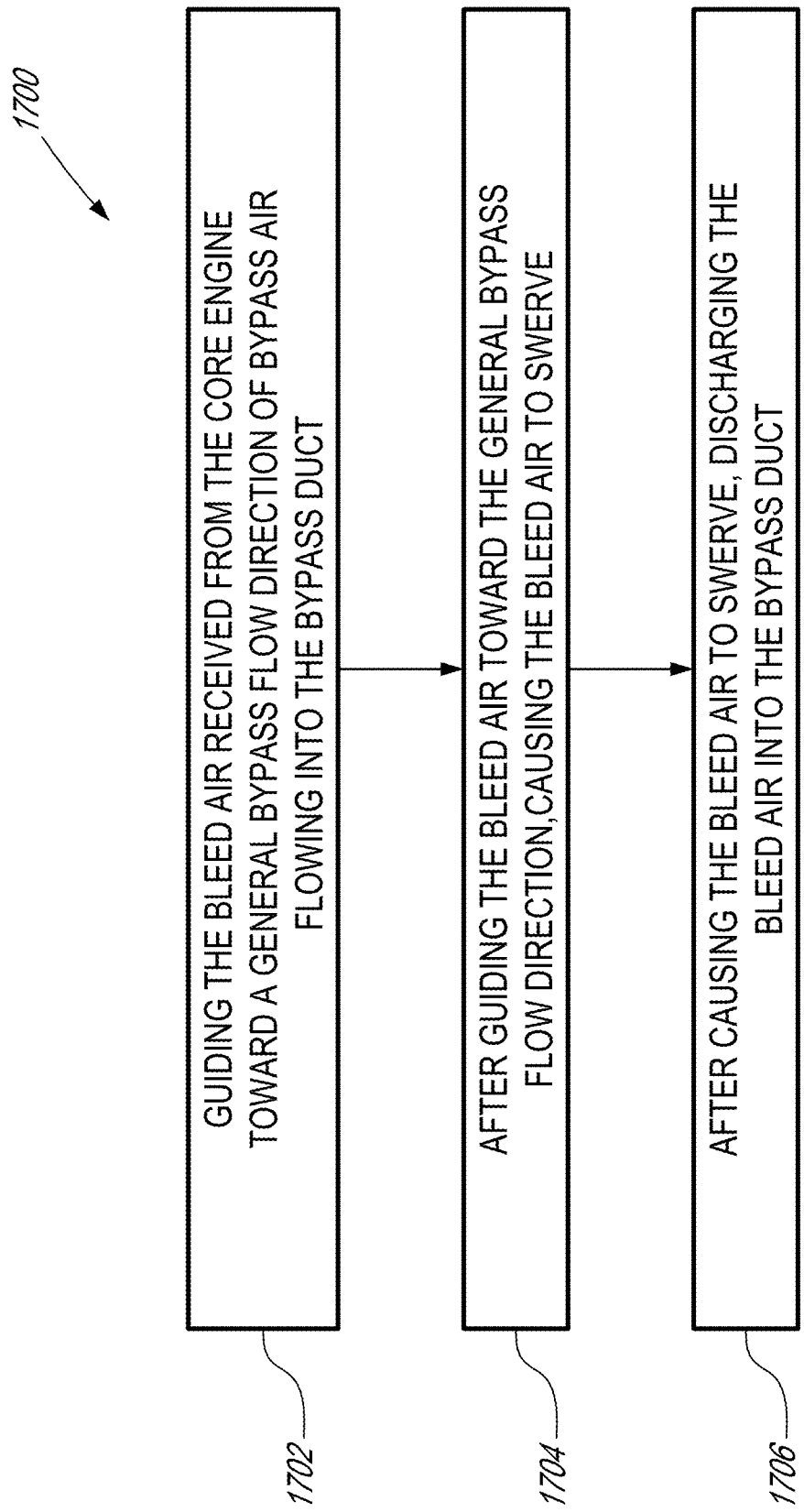
FIG. 17 is a flow chart of a method of guiding bleed air in the turbofan engine.

FIG. 17 is a flow chart of a method 1700 of guiding bleed air 208 in the turbofan engine 100. In some embodiments, the method 1700 may be performed using the louver 1500, 128. The method 1700 may include: guiding the bleed air 208 received from the core engine 122 toward a general bypass flow direction 1424 of bypass air 214 flowing into the bypass duct 104 (block 1702); after guiding the bleed air 208 toward the general bypass flow direction 1424, causing the bleed air 208 to swerve (block 1704); and after causing the bleed air 208 to swerve, discharging the bleed air 208 into the bypass duct 104 (block 1706).

In some embodiments of the method 1700, the bleed air 208 is discharged into the bypass duct 104 via an opening 1408 through the inner casing 106 of the turbofan engine 100 defining part of the bypass duct 104, and a region 1420 of relatively low pressure is generated in the bypass duct 104 at or upstream of the opening 1408 to draw the bypass air 214 toward the inner casing 106. In some embodiments of the method 1700, causing the bleed air 208 to swerve includes guiding the bleed air 208 radially inwardly relative to the central axis 114 of the turbofan engine 100. A louver 1500, 128 may be used to: guide the bleed air 208 toward the bypass flow direction 1424; cause the bleed air 208 to swerve; and cause the region 1420 of relatively low pressure in the bypass duct 104 at or upstream of the opening 1408 through the inner casing 106.

Figure 18:
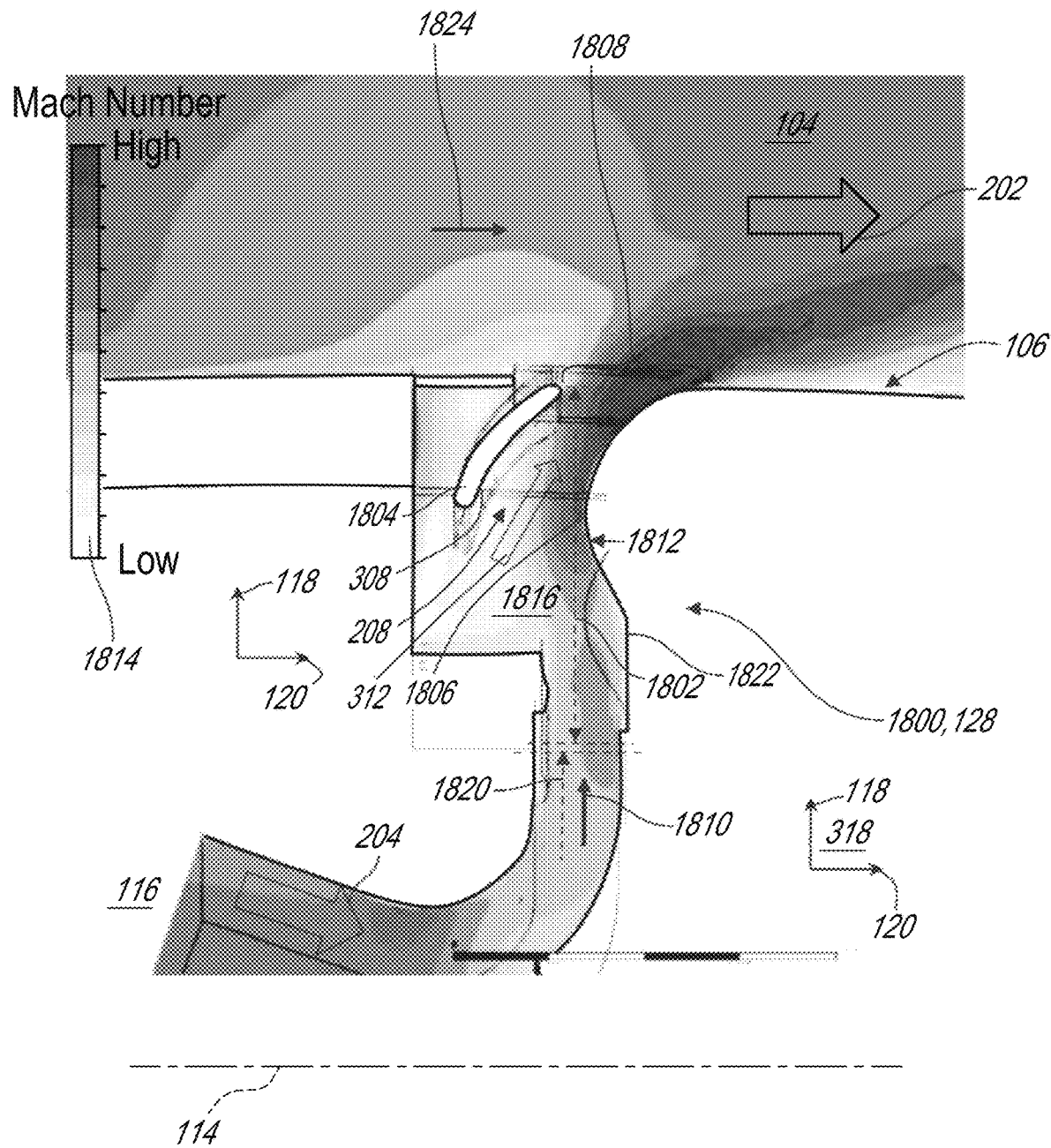
FIG. 18 is a schematic cross-sectional view of another bleed air device of the turbofan engine in the plane parallel to and containing the central axis of the turbofan engine, showing contours of Mach number in the bleed air passage.

FIG. 18 is a schematic cross-sectional view of an exemplary bleed air duct 1800, 128 of the turbofan engine 100 in the plane 318, showing contours of Mach number in the bleed air passage 1816 defined by the bleed air duct 1800, 128 as represented by the contour levels 1814.

Figure 19:
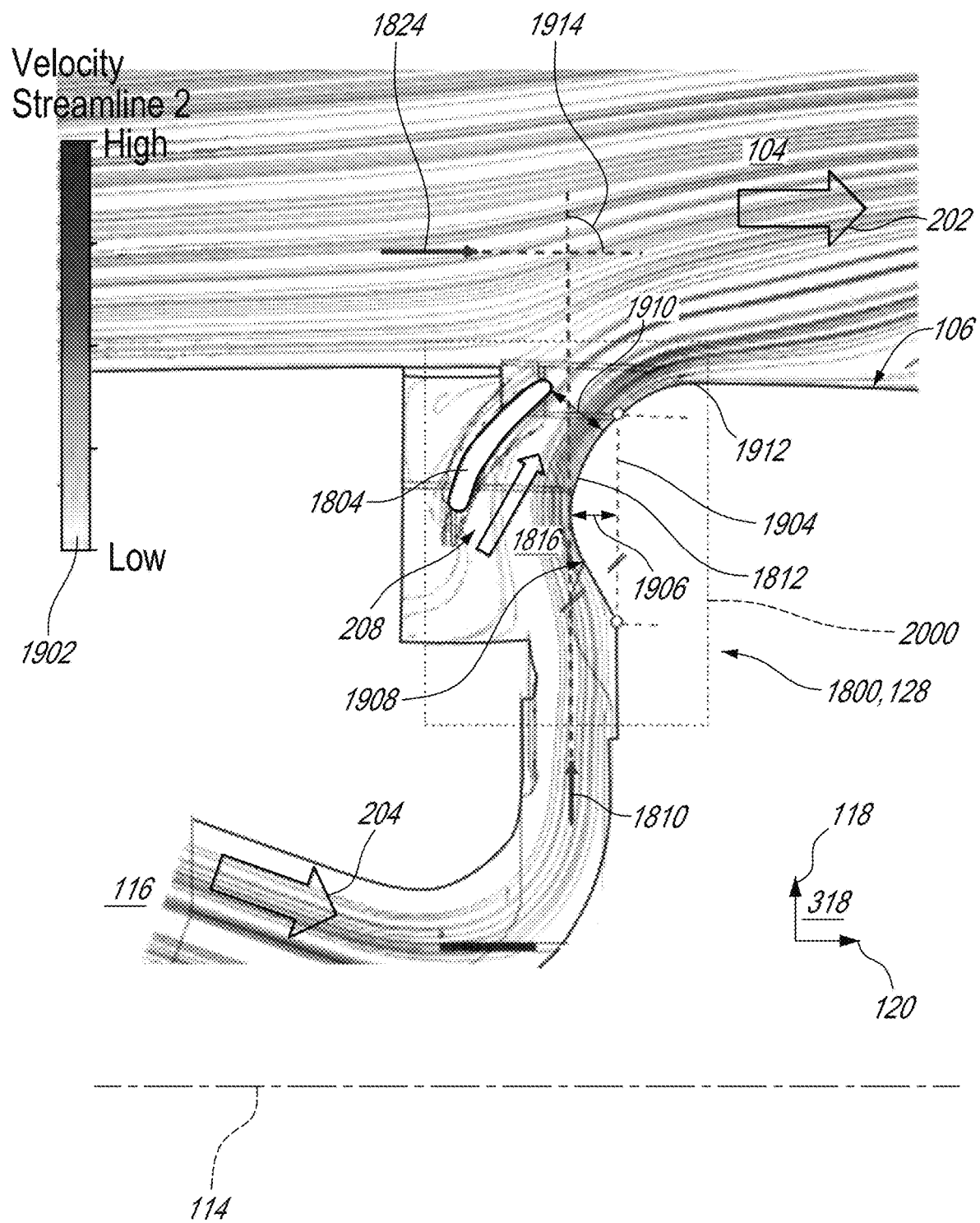
FIG. 19 is another schematic cross-sectional view of the bleed air device of FIG. 18 in the plane parallel to and containing the central axis, showing streamlines of flow in the bleed air passage.

FIG. 19 is a schematic cross-sectional view of the bleed air duct 1800, 128 of FIG. 18 in the plane 318, showing streamlines of flow in the bleed air passage 1816 and which are shaded by speed as represented by the contour levels 1902.

Figure 20:
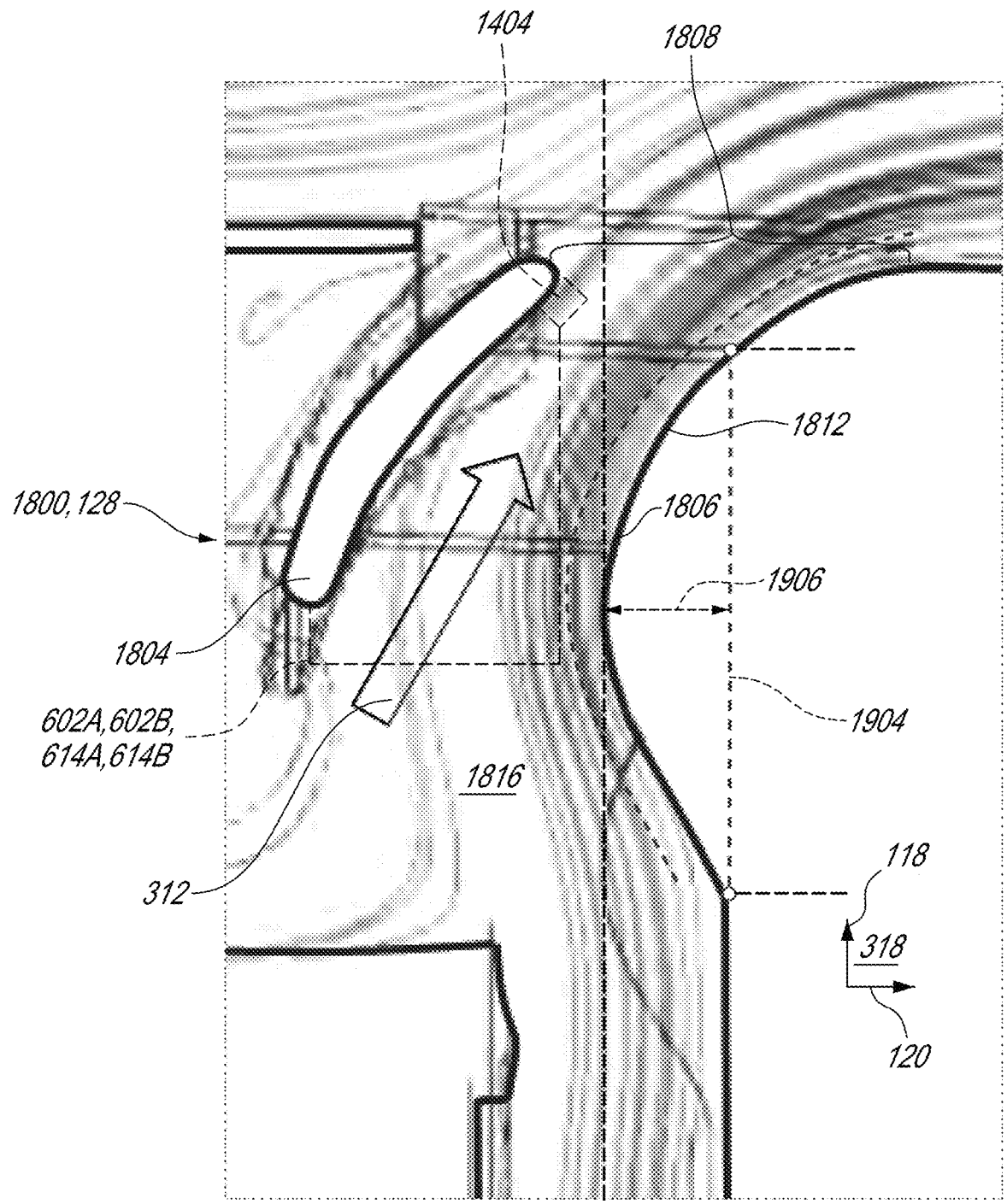
FIG. 20 is an enlarged view of region 2000 of FIG. 19.

FIG. 20 is an enlarged view of region 2000 of FIG. 19. The bleed air duct 1800, 128 may comprise a louver 1804 and a baffle 1812. The baffle 1812 and the louver 1804 may define part of the bleed air passage 1816. The baffle 1812 may have a curved cross-sectional profile, such as an S-shape or concave-convex shape profile in an axial-radial plane 318. The baffle 1812 may direct the bleed air 208 in a manner that promotes desirable flow conditions in the bypass duct 104. As shown in stippled lines, the louver 1804 may also include one or more side walls 602A, 602B, 614A, 614B of the device (e.g., louver) 600 (shown in FIG. 6) and/or protruding portion 1404 of the louver 1500 (shown in FIG. 15).

The bleed air duct 1800, 128 may convey the bleed air 208 from the core engine 122 to the bypass duct 104 of the turbofan engine 100 via an opening 1808 formed through the inner casing 106. The bleed air passage 1816 may extend angularly partially around the central axis 114.

The bleed air duct 1800, 128 may include a first duct portion 1820 (shown in FIG. 18) configured to convey the bleed air 208 along a general bleed flow direction 1810. In various embodiments, the general bleed flow direction 1810 may be transverse to the general bypass flow direction 1824. For example, an angle 1914 between the general bleed flow direction 1810 and the bypass flow direction 1824 may be between 45 and 120 degrees, between 60 and 120 degrees, between 60 and 105 degrees, between 75 and 105 degrees, or about 90 degrees of the general bypass flow direction 1824 of the bypass duct 104.

A second duct portion 1802 may be disposed (e.g., immediately) downstream of the first duct portion 1820. The second duct portion 1802 may be configured to guide the bleed air 208 from the general bleed flow direction 1810 toward the general bypass flow direction 1824. The second duct portion 1802 may include the baffle 1812.

The baffle 1812 may have a cross-sectional profile 1908 in the plane 318 parallel to and intersecting the central axis 114. In reference to FIG. 18, the baffle 1812 may include a concave portion 1822 that is concave relative to the bleed air passage 1816 and a convex portion 1806 that is convex relative to the bleed air passage 1816. The convex portion 1806 may be disposed downstream of the concave portion 1822. The convex portion 1806 may include a curved portion protruding into the bleed air duct 1800, 128. The concave portion 1822 may correspond to a depression or recessed portion of the bleed air passage 1816. Either or both of the concave portion 1822 and convex portion 1806 may be curved. For example, the cross-sectional profile of convex portion 1806 may be bow-shaped or arcuate. The convex portion 1806 and concave portion 1822 may respectively define a convex surface and a concave surface of the baffle 1812 exposed to bleed air flow 312. The baffle 1812 may have a unitary construction including both the convex portion 1806 and the concave portion 1822. Alternatively, the baffle 1812 may be made of multiple pieces assembled together. The baffle 1812 may be made from forming a suitable sheet metal for example. Alternatively, the baffle 1812 may be made from a polymer or fibre-reinforced composite material for example.

The concave portion 1822 and convex portion 1806 may smoothly connect (e.g., be tangent continuous) to form a continuous flow-guiding surface. The convex portion 1806 of the cross-sectional profile 1908 may be longer than the concave portion 1822 of the cross-sectional profile 1908. The length may be measured using arc length of the cross-sectional profile 1908 and/or the length along the general bleed flow direction 1810.

The cross-sectional profile 1908 may have a chord 1904 of maximum chord length that is substantially parallel to the general bleed flow direction 1810. The cross-sectional profile 1908 may have a maximum height 1906 from the chord 1904. The maximum height 1906 provides a measure of the depth of the baffle 1812, or a convex portion 1806 thereof, into the bleed air passage 1816. In various embodiments, the maximum height 1906 may be between 5% and 100% of the length of the chord 1904. In some embodiments, the maximum height 1906 may be between 10% and 50% of the length of the chord 1904. In some embodiments, the maximum height 1906 may be between 5% and 75% of the length of the chord 1904. The configuration of the cross-sectional profile 1908 of the baffle 1812 may depend on the amount of space available to accommodate the bump in the baffle 1812 defined by the maximum height 1906. In reference to FIG. 19, the bump in the baffle 1812 pushes the flow to the left (i.e., forward) and then guides the flow to the right (i.e., aft) before being discharged into the bypass duct 104.

The louver 1804 may cooperate with the baffle 1812 to define the part of the bleed air passage 1816. The baffle 1812 may be disposed aft of the louver 1804 relative to the central axis 114. The louver 1804 may cooperate with the convex portion 1806 of the baffle 1812 to define a throat 1910 of the bleed air passage 1816. The throat 1910 may be a section of the bleed air passage 1816 between the louver 1804 and baffle 1812 having a shortest distance between the louver 1804 and baffle 1812. The throat 1910 may be located substantially at a trailing end of the louver 1804.

A concave-convex (or S-shaped) baffle 1812 may, in some embodiments, cause the (turbulence) diffusion rate on the baffle 1812 to be reduced and the flow separation in the bypass duct 104 to be reduced. In some embodiments, an ensuing pressure drop 220 may be reduced compared to other configurations. FIG. 19 and (FIG. 20) shows that the flow remains substantially attached to the baffle 1812 at the trailing edge 1912 of the baffle 1812.

The concave-convex configuration of the baffle 1812 may cause bleed air flow 312 (shown in FIG. 20) to adopt an orientation that is partially in opposition to the general bypass flow direction 1824 in the concave portion 1822, and then, in the convex portion 1806, cause the bleed air flow 312 to turn toward the general bypass flow direction 1824.

FIG. 21 is a flow chart of a method 2100 of guiding bleed air 208 in the turbofan engine 100 having a core engine 122 and the bypass duct 104. In some embodiments, the method 2100 may be performed using baffle 1812. The method 2100 may include conveying the bleed air 208 received from the core engine 122 along a general bleed flow directions 1820 that is between 60 and 120 degrees (or between 45 and 120 degrees, between 60 and 105 degrees, between 75 and 105 degrees, or about 90 degrees) of the general bypass flow direction 1424 of the bypass duct 104 (block 2102); after conveying the bleed air 208 along the general bleed flow direction 1810, guiding the bleed air 208 away from the general bleed flow direction 1810 (block 2104); after conveying the bleed air 208 along the general bleed flow direction 1810, guiding the bleed air 208 toward the general bleed flow direction 1810 (block 2106); and after guiding the bleed air 208 along the general bleed flow direction 1810, discharging the bleed air 208 into the bypass duct 104 (block 2108).

After guiding the bleed air 208 toward the general bleed flow directions 1820 and before discharging the bleed air 208 into the bypass duct 104, the method 2100 may include guiding the bleed air 208 toward the general bypass flow direction 1824. Some embodiments of the method 2100 may comprise: using a concave surface to guide the bleed air 208 away from the general bleed flow direction 1810; and using a convex surface to guide the bleed air 208 toward the general bleed flow direction 1810 and to guide the bleed air 208 toward the general bypass flow direction 1824.

Some embodiments of the method 2100 may comprise: after conveying the bleed air 208 along the general bleed flow direction 1810 and before discharging the bleed air 208 into the bypass duct 104, causing a deviation (e.g., chord height 1906) of the bleed air 208 spanning over a distance (e.g., chord 1904) along the general bleed flow direction 1810. A maximum amount of the deviation may be 15% or more of the of the distance (e.g., chord 1904) along the general bleed flow direction 1810.

Figure 22:
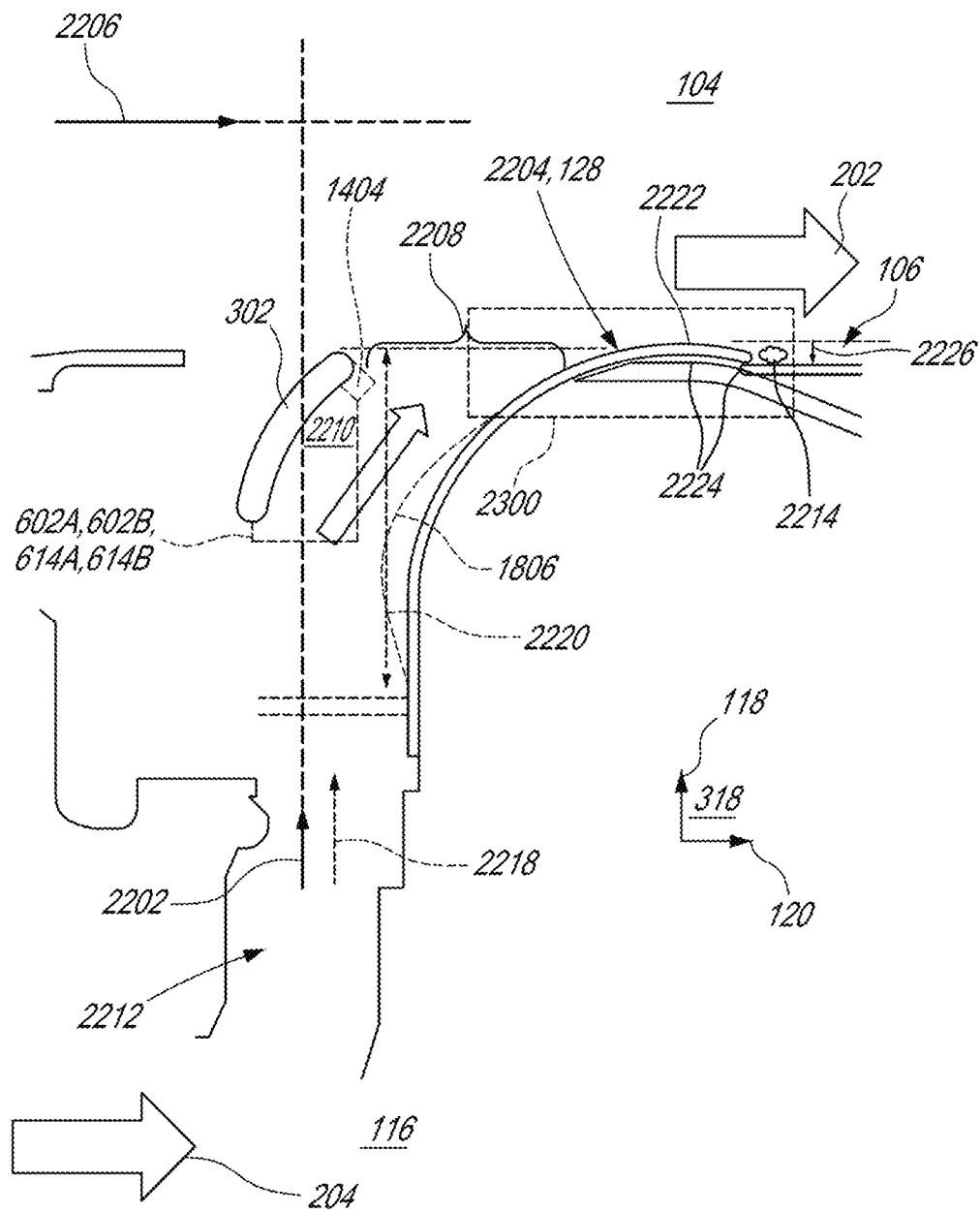
FIG. 22 is a schematic cross-sectional view of another exemplary bleed air device of the turbofan engine in the plane parallel to and containing the central axis of the turbofan engine.

FIG. 22 is a schematic cross-sectional view of an exemplary baffle 2204, 128 of the turbofan engine 100 in the plane 318 parallel to and containing the central axis 114 of the turbofan engine 100. As shown in stippled lines, the louver 302 may also include one or more side walls 602A, 602B, 614A, 614B of the device (e.g., louver) 600 (shown in FIG. 6) and/or protruding portion 1404 of the louver 1500 (shown in FIG. 15). As also shown in stippled lines, the baffle 2204 may also include the convex portion 1806 of the baffle 1812 (shown in FIG. 20).

Figure 23:
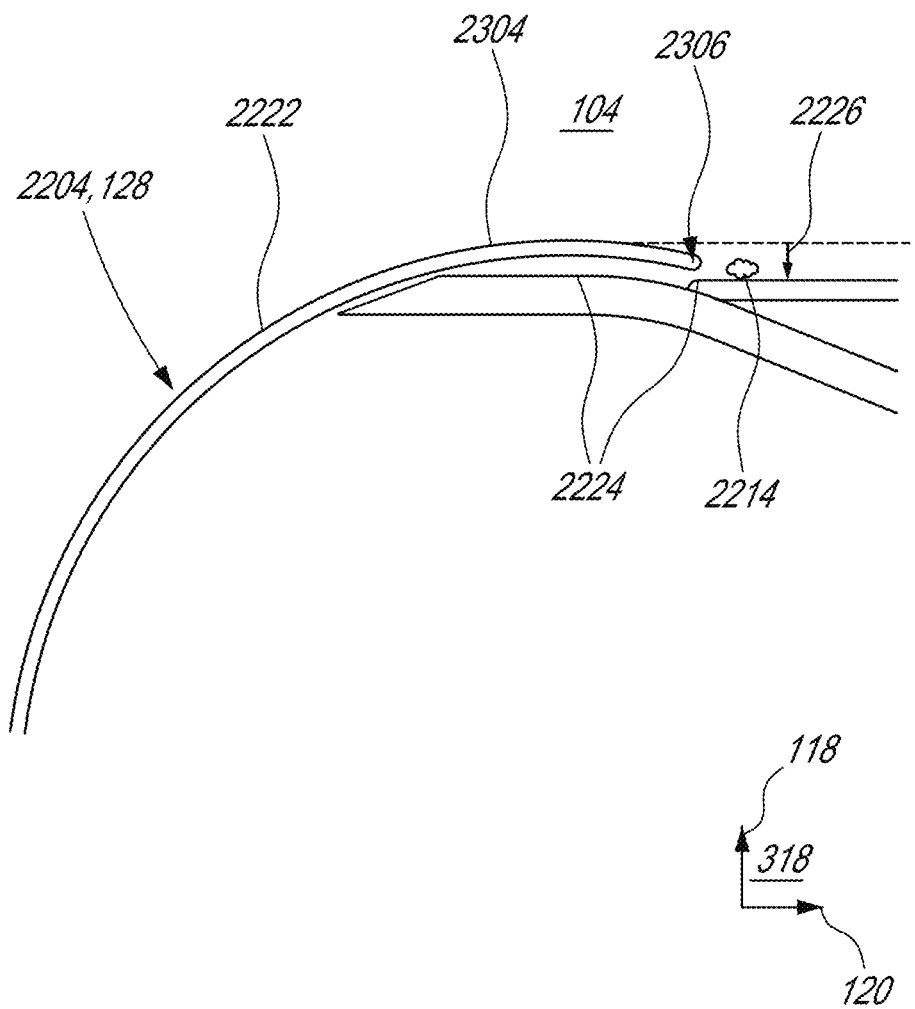
FIG. 23 is an enlarged view of region 2300 of FIG. 22.

FIG. 23 is an enlarged view of the region 2300 of FIG. 22. The baffle 2204, 128 may define part of a bleed air duct 2212 at least partially defining a bleed air passage 2210. The baffle 2204, 128 defines a flow-guiding surface 2222 for guiding the bleed air 208 toward the bypass duct 104. An upstream duct portion 2218 may be configured to convey the bleed air 208 along the general bleed flow direction 2202. A downstream duct portion 2220 may be disposed downstream of the upstream duct portion 2218 and may be configured to guide the bleed air 208 from the general bleed flow direction 2202 toward the general bypass flow direction 2206.

A portion 2304 of the baffle 2204, 128 may protrude into the bypass duct 104 when installed in the turbofan engine 100. The portion 2304 may overlap a surface 2224 of the inner casing 106. The baffle 2204, 128 may be used to guide the bleed air 208 toward a general bypass flow direction 2206 of the bypass duct 104 at a location upstream of the bypass duct 104. Thereafter, the baffle 2204 may be used to guide the bleed air 208 at a location inside the bypass duct 104 as well.

A trailing edge 2306 of the baffle 2204 may be disposed inside the bypass duct 104. The edge 2306 may be an end of the portion 2304. In some embodiments, the edge 2306 may be slightly displaced (i.e., raised) from the inner casing 106, such as to form step 2226 inside the bypass duct 104. In some embodiments, the step 2226 may interact with flow discharging from the bleed air duct 2212 and the bypass flow 202 to generate a low pressure zone 2214 downstream thereof. The step 2226 may be a radially-inward displacement between an upstream to a downstream location of the edge 2306. The baffle 2204, 128 may extend into the bypass duct 104 over the inner casing 106 to create a protrusion in the bypass flow 202 and the region 2214 of relatively low pressure downstream thereof. In some embodiments, the region of relatively low pressure 2214 may help keep the flow more attached to the inner casing 106 downstream of the opening 2208, thereby reducing the pressure drop 220 in the bypass duct 104.

The baffle 2204,128 may have a unitary construction or may be made of multiple pieces assembled together. The baffle 2204,128 may be made from forming a suitable sheet metal for example. Alternatively, the baffle 2204,128 may be made from a polymer or fibre-reinforced composite material for example. In various embodiments, the step 2226 may have a height between 3% and 10% of the dimension of a throat (such as throat 2616 shown in FIG. 25) between the louver 302 and the baffle 2204, 128 shown in FIG. 22.

The baffle 2204,128 may include a convex flow-guiding surface 2222 that is convex relative to the bleed air passage 2210. The convex flow-guiding surface 2222 may extend into the bypass duct 104. The bleed air duct 2212 may include a louver 302, 128 (or other louvers described herein) cooperating with the baffle 2204,128 to guide the bleed air 208 toward the bypass duct 104. The baffle 2204,128 may be disposed aft of the louver 302, 128 relative to the central axis 114 of the turbofan engine 100.

Figure 24:
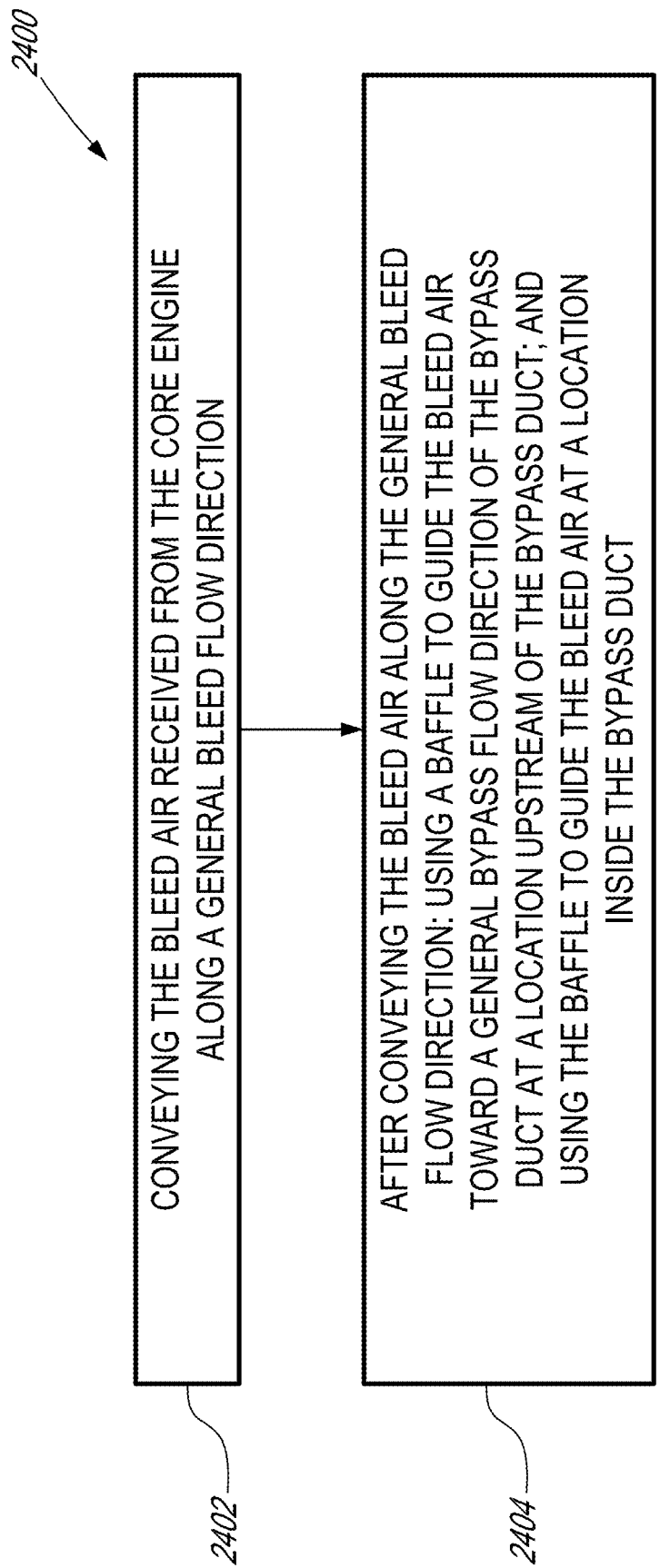
FIG. 24 is a flow chart of another method of guiding bleed air in the turbofan engine.

FIG. 24 is a flow chart of a method 2400 of guiding bleed air 208 in the turbofan engine 100 having a core engine 122 and the bypass duct 104. In some embodiments, the method 2400 may be performed using the baffle 2204. The method 2400 may include: conveying the bleed air 208 received from the core engine 122 along the general bleed flow direction 2202 (e.g., between 60 and 120 degrees, between 45 and 120 degrees, between 60 and 105 degrees, between 75 and 105 degrees, or about 90 degrees of the general bypass flow direction 2206) (block 2402); and after conveying the bleed air 208 along the general bleed flow direction 2202: using a baffle 2204 to guide the bleed air 208 toward the general bypass flow direction 2206 of the bypass duct 104 at a location upstream of the bypass duct 104; and using the baffle 2204 to guide the bleed air 208 at a location inside the bypass duct 104 (block 2404).

Some embodiments of the method 2400 comprise: using a portion 2304 of the baffle 2204,128 protruding into the bypass duct 104 to cause a region of relatively low pressure 2214 inside the bypass duct 104. The region of relatively low pressure 2214 may be located downstream of the portion 2304 of the baffle 2204,128 protruding into the bypass duct 104. The location inside the bypass duct 104 may be raised from the radially-inner surface 2224 of the bypass duct 104 defined by the inner casing 106. The baffle 2204,128 may include the convex flow-guiding surface 2222 that extends into the bypass duct 104. The trailing edge 2306 of the baffle 2204,128 may define the step 2226 inside the bypass duct 104.

Figure 25:
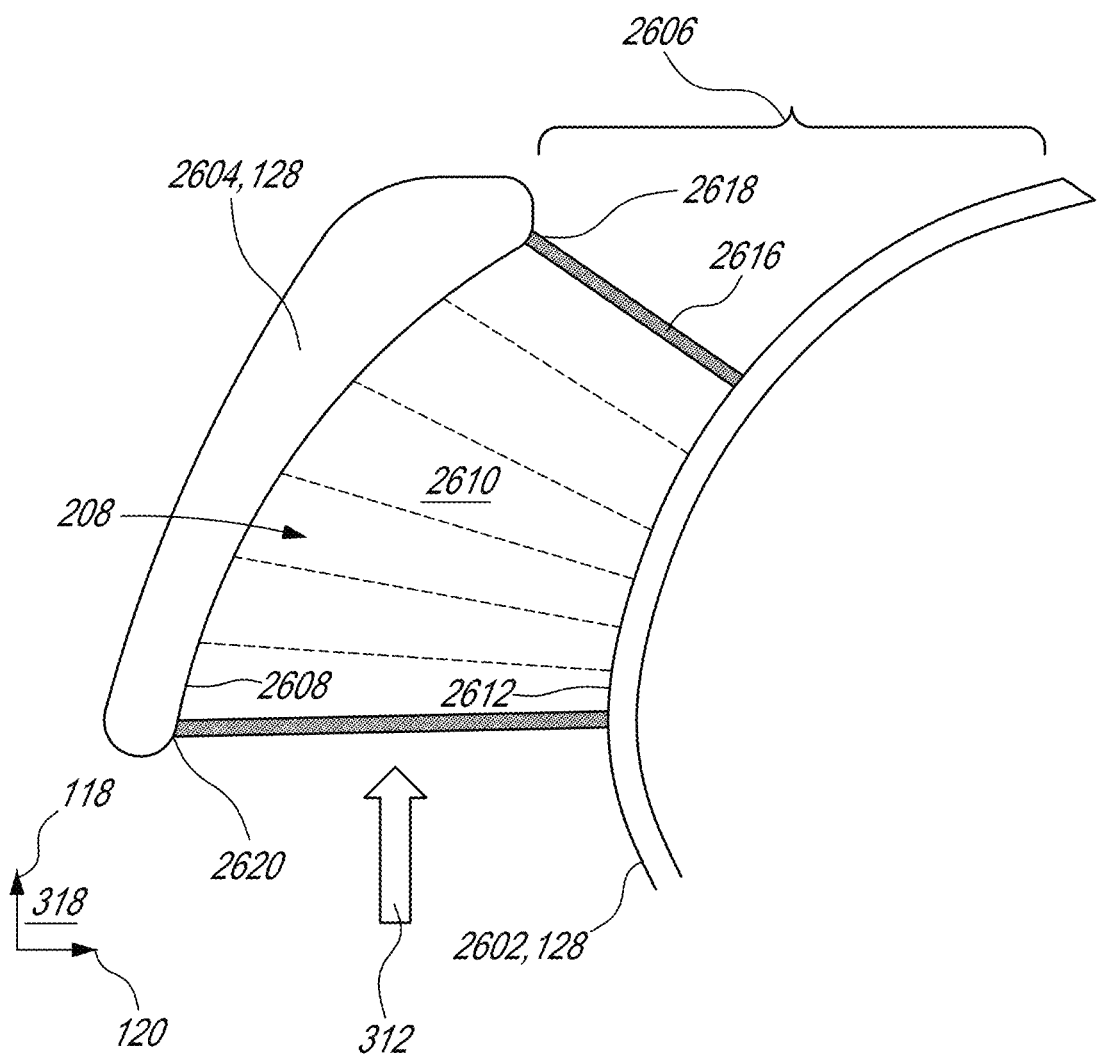
FIG. 25 is a schematic cross-sectional view of a baffle-louver arrangement of the turbofan engine in the plane parallel to and containing the central axis of the turbofan engine.

FIG. 25 is a schematic axial cross-sectional view of another baffle-louver arrangement which may include a baffle 2602, 128 and a louver 2604, 128. The baffle-louver arrangement may define a bleed air passage 2610 between flow-guiding surface 2608 and flow-guiding surface 2612, which may extend angularly partially about the central axis 114. The throat 2616 may be defined at the minimum distance between the opposing flow guiding surfaces 2608 and 2612. The location of throat 2616 at or near the trailing end 2618 of the louver 2604 may, in some embodiments, promote favorable flow conditions as the bleed air 208 enters the bypass duct 104 via the opening 2606.

In some embodiments, the length of the throat 2616 in the plane 318 may be between 25-40% smaller than the comparable distance at the leading end 2620 of the louver 2604, 128. Alternatively or additionally, the location of the throat 2616 may be achieved by selection of the geometry of the baffle 2602, 128 and/or the louver 2604, 128. The location of the throat 2616 and/or the amount of streamwise area reduction along the louver 2604, 128 may be achieved using various combinations of louvers and baffles described herein.

Various combinations of devices (and methods) disclosed herein may be effectively employed. For example, the device 600, louver 1500, 128, the louver 302, 128, and the louver 2604, 128 may each be configurable to cooperate with one of the baffles 1812, 2204, 2602. The device 600, louver 302, 128, and louver 2604, 128 may each also include a protruding portion such as that of the louver 1500, 128. Similarly, the louver 1500, 128 may include side walls such as those of the device 600, 128. The baffle 1812, 128 may include a portion protruding into the bypass duct 104 such as that of the baffle 2204, 128. Other combinations of various embodiments louvers and baffles described herein are contemplated.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, different combinations of louvers and baffles may be combined, and a plurality of bleed air flow passages may be disposed angularly around the central axis of the engine. Yet further modifications could be implemented by a person of ordinary skill in the art in view of the present disclosure, which modifications would be within the scope of the present technology.

What is claimed is:

1. A louver for guiding bleed air into a bypass duct of a turbofan engine, the louver comprising:
   an axial direction along a central axis of the turbofan engine and a radial direction perpendicular to the axial direction;
   a first portion defining a flow-guiding surface at least partially defining a bleed air passage, the first portion having a first camber line extending from a leading edge of the louver to a trailing end of the first portion; and
   a second portion extending from the trailing end of the first portion to a trailing edge of the second portion, the second portion protruding into the bleed air passage and having a second camber line that intersects the first camber line and forms a discontinuity in tangency with the first camber line at an intersection of the first camber line with the second camber line, the second camber line extending from the intersection to the trailing edge of the second portion, wherein:
   the leading edge of the louver is axially forward of the intersection and axially forward of the trailing edge of the second portion;
   the leading edge of the louver is radially inward of the intersection and radially inward of the trailing edge of the second portion; and
   the trailing edge of the second portion is radially inward of the intersection.

2. The louver as defined in claim 1, wherein the first and second portions have a unitary construction.

3. The louver as defined in claim 1, wherein:
   the first camber line is curved; and
   the second camber line is linear.

4. The louver as defined in claim 3, wherein the first camber line is arcuate.

5. The louver as defined in claim 1, wherein the first and second camber lines define an intersecting angle between 45 and 135 degrees.

6. The louver as defined in claim 1, wherein a length of the second camber line is between 4% and 40% of a sum of a length of the first camber line and a length of the second camber line.

7. The louver as defined in claim 1, wherein a width of the second portion measured transversely to the second camber line is between 2% and 40% of a sum of a length of the first camber line and a length of the second camber line.

8. The louver as defined in claim 1, wherein the second portion includes a protruding surface adjacent the flow-guiding surface and oriented at an angle between 45 and 135 degrees of the flow-guiding surface.

9. A turbofan engine comprising:
a core engine having an axial direction relative to a central axis of the turbofan engine and a radial direction perpendicular to the axial direction;
an inner casing in which the core engine is disposed;
a bypass duct defined between the inner casing and an outer casing; and
a louver defining part of a bleed air passage extending between the core engine and the bypass duct via an opening through the inner casing, the louver including:
a first portion defining a flow-guiding surface at least partially defining the bleed air passage, the flow-guiding surface having an upstream end and a downstream end, the first portion having a first camber line extending from a leading edge of the louver to a trailing end of the first portion; and
a second portion extending from the trailing end of the first portion to a trailing edge of the second portion, the second portion adjacent the downstream end of the flow-guiding surface and protruding into the bleed air passage to obstruct a flow of bleed air guided by the flow-guiding surface of the first portion,
wherein:
the second portion has a second camber line that intersects the first camber line and forms a discontinuity in tangency with the first camber line at an intersection of the first camber line with the second camber line;
the second camber line extends from the intersection to the trailing edge of the second portion;
the leading edge of the louver is axially forward of the intersection and axially forward of the trailing edge of the second portion:
the leading edge of the louver is radially inward of the intersection and radially inward of the trailing edge of the second portion; and
the trailing edge of the second portion is radially inward of the intersection.

10. The turbofan engine as defined in claim 9, wherein the second portion defines a protruding surface adjacent the flow-guiding surface, the protruding surface having a curvature different from the flow-guiding surface.

11. The turbofan engine as defined in claim 10, wherein:
the flow-guiding surface has a curved cross-sectional profile in a plane parallel to and intersecting the central axis of the turbofan engine; and
the protruding surface has a linear cross-sectional profile in the plane.

12. The turbofan engine as defined in claim 11, wherein the linear cross-sectional profile is oriented at an angle between 45 and 135 degrees relative to the curved cross-sectional profile.

13. The turbofan engine as defined in claim 11, wherein:
the protruding surface is a first protruding surface; and
B the second portion includes a second protruding surface parallel to the first protruding surface.

14. The turbofan engine as defined in claim 9, comprising a baffle opposite the louver and cooperating with the louver to define the part of the bleed air passage, the baffle and the second portion of the louver defining a throat of the bleed air passage.

15. The turbofan engine as defined in claim 9, wherein the first and second camber lines define an intersecting angle between 45 and 135 degrees.

16. The turbofan engine as defined in claim 9, wherein a length of the second camber line is between 4% and 40% of a sum of a length of the first camber line and a length of the second camber line.

17. A method of guiding bleed air in a turbofan engine having:
a core engine;
a bypass duct; and
a louver for guiding the bleed air from the core engine into the bypass duct of the turbofan engine, the louver including:
an axial direction relative to a central axis of the turbofan engine and a radial direction perpendicular to the axial direction;
a first portion defining a flow-guiding surface at least partially defining a bleed air passage, the first portion having a first camber line extending from a leading edge of the louver to a trailing end of the first portion; and
a second portion extending from the trailing end of the first portion to a trailing edge of the second portion, the second portion protruding into the bleed air passage and having a second camber line that intersects the first camber line and forms a discontinuity in tangency with the first camber line at an intersection of the first camber line with the second camber line, the second camber line extending from the intersection to the trailing edge of the second portion,
wherein:
the leading edge of the louver is axially forward of the intersection and axially forward of the trailing edge of the second portion;
the leading edge of the louver is radially inward of the intersection and radially inward of the trailing edge of the second portion; and
the trailing edge of the second portion is radially inward of the intersection,
the method comprising:
guiding the bleed air received from the core engine with the louver toward a bypass flow direction of bypass air flowing into the bypass duct;
after guiding the bleed air toward the bypass flow direction, causing, with the louver, the bleed air to swerve; and
after causing the bleed air to swerve, discharging the bleed air into the bypass duct.

18. The method as defined in claim 17, wherein:
the bleed air is discharged into the bypass duct via an opening through an inner casing of the turbofan engine defining part of the bypass duct; and
the method includes causing a region of relatively low pressure in the bypass duct at or upstream of the opening to draw the bypass air toward the inner casing.

19. The method as defined in claim 18, wherein:
causing the bleed air to swerve includes guiding the bleed air radially inwardly relative to the central axis of the turbofan engine; and
the flow-guiding surface is used to guide the bleed air toward the bypass flow direction;
the second portion is used to cause the bleed air to swerve; and
the louver is used to cause the region of relatively low pressure in the bypass duct at or upstream of the opening through the inner casing.

* * * * *